US012612082B1

(12) United States Patent
Kobilarov et al.

(10) Patent No.: US 12,612,082 B1
(45) Date of Patent: Apr. 28, 2026

(54) IDENTIFYING RELEVANT OBJECTS BASED ON ARTIFICIAL PATHS

(71) Applicant: Zoox, Inc., Foster City, CA (US)

(72) Inventors: Marin Kobilarov, Baltimore, MD (US); Linjun Zhang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 213 days.

(21) Appl. No.: 18/394,908

(22) Filed: Dec. 22, 2023

(51) Int. Cl.
B60W 60/00 (2020.01)

(52) U.S. Cl.
CPC ..... B60W 60/0027 (2020.02); B60W 2552/53 (2020.02); B60W 2554/402 (2020.02); B60W 2554/4041 (2020.02); B60W 2554/4049 (2020.02); B60W 2556/10 (2020.02); B60W 2556/40 (2020.02)

(58) Field of Classification Search
CPC .... B60W 30/08; B60W 30/09; B60W 30/095; B60W 30/0953; B60W 30/18154; B60W 30/18159; B60W 50/0097; B60W 60/001; B60W 60/0027; B60W 60/00272; B60W 60/00274; B60W 2520/10; B60W 2552/45; B60W 2552/53; B60W 2554/402; B60W 2554/4029; B60W 2554/4041; B60W 2554/4042; B60W 2554/4045; B60W 2554/4044; B60W 2554/4049; B60W 2554/80; B60W 2556/10; B60W 2556/40; B60W 2754/10;

G08G 1/16; G08G 1/166; G06V 20/56; G06V 20/58; G05D 1/0212; G05D 1/0214; G05D 1/617; G05D 1/622; G05D 1/633
See application file for complete search history.

(56) References Cited

U.S. PATENT DOCUMENTS

| | | | |
|---|---|---|---|
| 10,649,459 B2 | 5/2020 | Wang et al. | |
| 11,370,424 B1 * | 6/2022 | Cohen | G06V 10/25 |
| 2020/0156632 A1 * | 5/2020 | Ding | B60W 30/0956 |
| 2020/0298847 A1 * | 9/2020 | Tawari | B60W 30/0953 |

(Continued)

OTHER PUBLICATIONS

U.S. Appl. No. 17/854,269, filed Jun. 30, 2022, Kobilarov, et al., "Identifying Relevant Objects Within an Environment", 51 pages.

(Continued)

*Primary Examiner* — Brandon Z Willis

(74) *Attorney, Agent, or Firm* — Lee & Hayes, P.C.

(57) ABSTRACT

Techniques for identifying relevant objects in an environment based on artificial paths are described herein. A vehicle may receive and/or analyze sensor data of an environment to identify an object. The vehicle may determine whether the object is located within a region of interest by projecting the object into discretized map data and determining which cell of the discretized map data the object is located within. Based on the object being located within a cell corresponding to a region of interest, the vehicle can generate an artificial path (e.g., a spatial representation of potential movements of the object) for the object which may be used to determine whether the vehicle and the object overlap (e.g., spatially and temporally) at any cell within an occupancy map. In such cases, the vehicle may generate a relevance score for the object which may be used to control the vehicle.

20 Claims, 7 Drawing Sheets

(56) References Cited

U.S. PATENT DOCUMENTS

| | | | |
|---|---|---|---|
| 2021/0347383 A1* | 11/2021 | Siebert ............... | G01C 21/3407 |
| 2022/0135029 A1* | 5/2022 | Poubel Orenstein ......................... | |
| | | | B60W 30/0953 |
| | | | 701/301 |
| 2023/0234617 A1* | 7/2023 | Tweddle ........... | B60W 30/0953 |
| 2023/0342635 A1* | 10/2023 | Puphal ................ | G05D 1/0214 |
| 2024/0140482 A1* | 5/2024 | Tairbekov .......... | B60W 60/0011 |
| 2024/0149918 A1* | 5/2024 | Li .......................... | G06N 20/00 |

OTHER PUBLICATIONS

U.S. Appl. No. 18/132,289, filed Apr. 7, 2023, Parikh, et al., "Machine-Learned Model for Detecting Object Relevance to Vehicle Operation Planning", 48 pages.

* cited by examiner

400

402

410    412    414    416    408

404

420    422    424    426    418

406

428    432    430

500

502

504

506

700

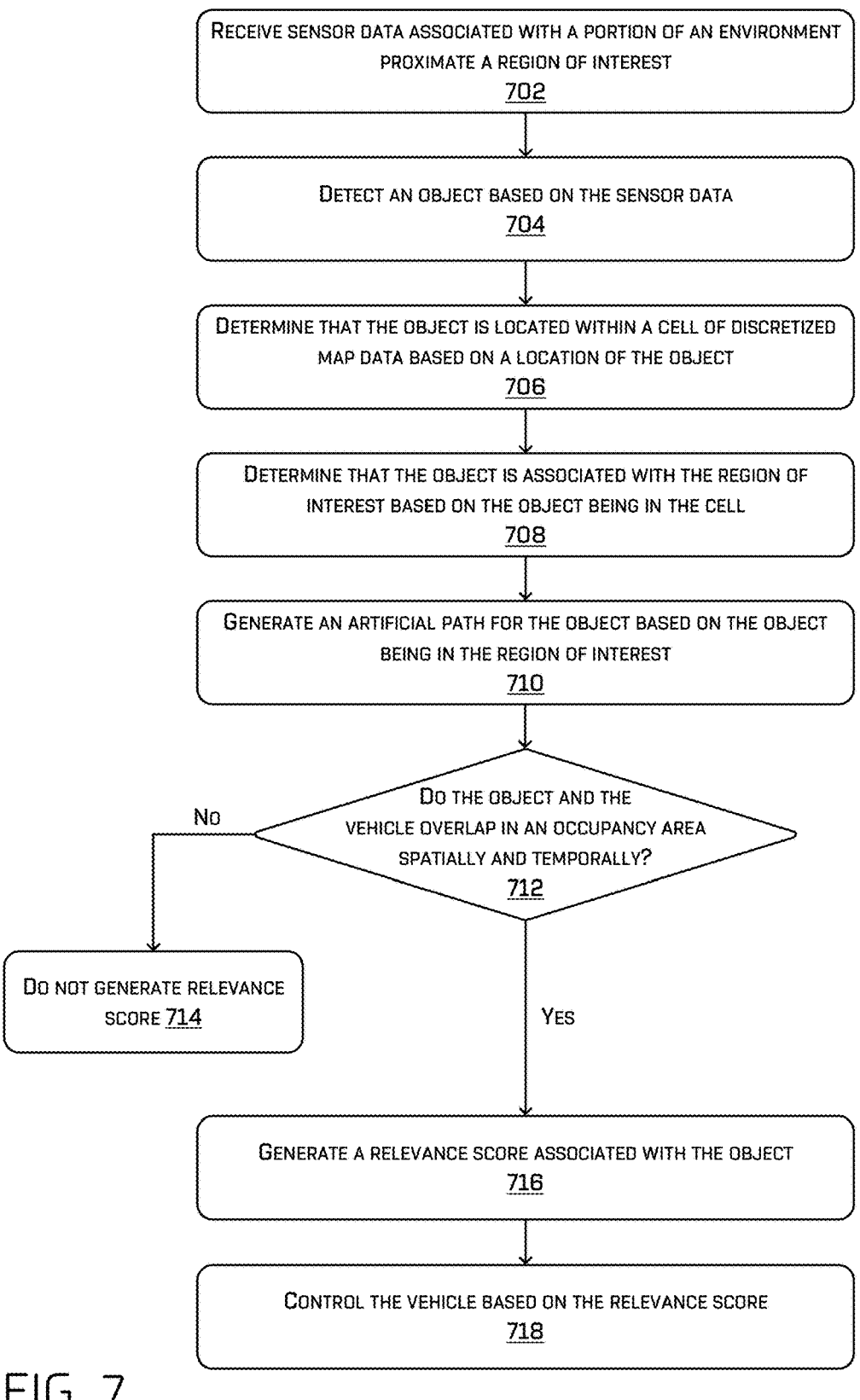

RECEIVE SENSOR DATA ASSOCIATED WITH A PORTION OF AN ENVIRONMENT
PROXIMATE A REGION OF INTEREST
702

DETECT AN OBJECT BASED ON THE SENSOR DATA
704

DETERMINE THAT THE OBJECT IS LOCATED WITHIN A CELL OF DISCRETIZED
MAP DATA BASED ON A LOCATION OF THE OBJECT
706

DETERMINE THAT THE OBJECT IS ASSOCIATED WITH THE REGION OF
INTEREST BASED ON THE OBJECT BEING IN THE CELL
708

GENERATE AN ARTIFICIAL PATH FOR THE OBJECT BASED ON THE OBJECT
BEING IN THE REGION OF INTEREST
710

DO THE OBJECT AND THE
VEHICLE OVERLAP IN AN OCCUPANCY AREA
SPATIALLY AND TEMPORALLY?
712

No

DO NOT GENERATE RELEVANCE
SCORE 714

YES

GENERATE A RELEVANCE SCORE ASSOCIATED WITH THE OBJECT
716

CONTROL THE VEHICLE BASED ON THE RELEVANCE SCORE
718

FIG. 7

IDENTIFYING RELEVANT OBJECTS BASED ON ARTIFICIAL PATHS

BACKGROUND

Vehicles, such as autonomous vehicles, may navigate along designated routes. In some examples, autonomous vehicles may encounter various types of static and/or dynamic objects within an environment. In some circumstances, the autonomous vehicle may use sensors to detect and/or classify these objects. Upon detecting such objects, the autonomous vehicle may determine which of the object(s) are relevant to the autonomous vehicle and consider such relevant object(s) when determining a trajectory to follow through the environment. However, in certain circumstances, techniques for identifying object(s) that are relevant to the autonomous vehicle can be inefficient and/or lead to inaccurate and/or misidentified relevant objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 is a flow diagram illustrating an example process for determining that an object is in a region of interest, generating an artificial path for the object based on the object being in the region of interest, determining that the vehicle and the object overlap at a cell of an occupancy map, and controlling the vehicle based on determining a relevance score for the object based on the spatial and temporal overlap, in accordance with one or more examples of the disclosure.

DETAILED DESCRIPTION

Figure 1:
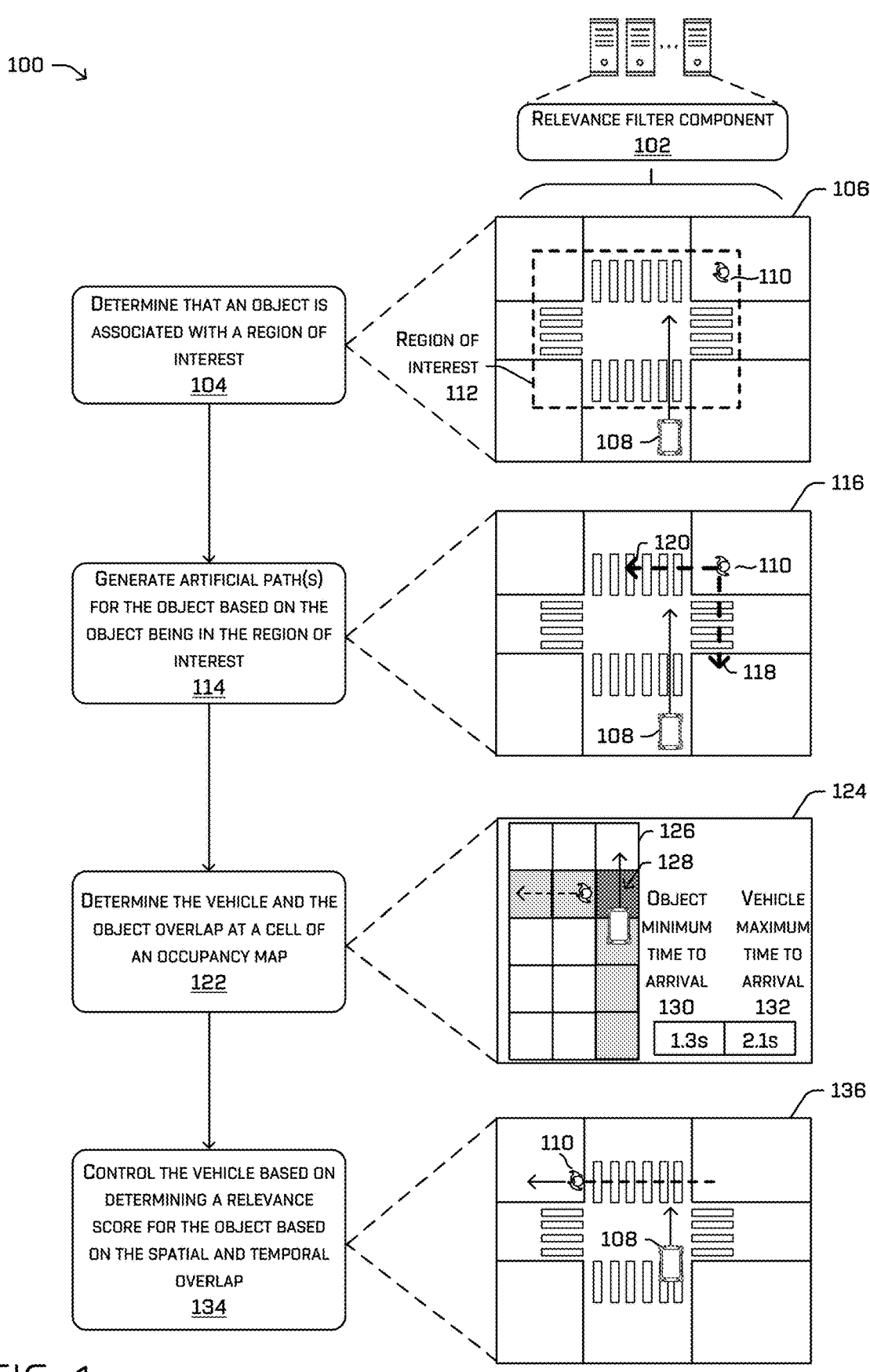
FIG. 1 is a pictorial flow diagram illustrating an example technique for identifying relevant objects based on artificial paths, in accordance with one or more examples of the disclosure.

Techniques for identifying relevant objects in an environment based on artificial paths are described herein. In some examples, a vehicle (such as an autonomous vehicle) may receive sensor data representing a portion of an environment that is proximate a region of interest (e.g., a crosswalk, an intersection, etc.) and/or determine that the vehicle will traverse such regions. The vehicle may analyze the sensor data to detect and/or identify a location (e.g., x-y coordinate) of an object within the environment. In such examples, the vehicle may determine whether the object is located within and/or will pass through or proximate to the region of interest by projecting the location (or location data) of the object into discretized map data and determining which cell of the discretized map data the object is located within. Based on the object being located within a cell corresponding to a region of interest, the vehicle can generate an artificial path (e.g., a spatial representation of potential movements of the object based on a heading and/or maximum velocity of the object along navigational routes typically used by the type of object) for the object which may be used to determine whether the object is relevant to the vehicle. That is, the vehicle may determine an occupancy map and determine whether the artificial path of the object and a trajectory of the vehicle cause the vehicle and the object to overlap (e.g., spatially and/or temporally) at any cell within the occupancy map. In such cases, based on identifying an overlap, the vehicle may generate a relevance score for the object which may ultimately be used to control the vehicle. As described in more detail below, the techniques described herein may improve vehicle safety and/or driving efficiency by ensuring that an accurate representation of the relevant object(s) in an environment are being evaluated by the vehicle, thereby enabling the vehicle to generate more efficient and accurate trajectories.

When determining relevancy while traversing an environment, a vehicle can receive and analyze sensor data captured by one or more sensor devices mounted thereto. When analyzing the sensor data, the vehicle can detect and/or classify one or more objects proximate the vehicle. In some instances, when determining the efficacy and/or safety of the vehicle candidate trajectories, the vehicle may identify which of the object(s) are relevant to the vehicle based on the candidate trajectories. As such, additional computational resources may be dedicated to those objects which are relevant to the travel of the vehicle.

In some cases, however, determination of relevancy may be more complex as some object(s) in the environment may be relevant to the vehicle despite not having a trajectory (e.g., the object is stationary) or having a trajectory that does not interact with the vehicle trajectory. For example, objects that are slow moving (e.g., velocity below a threshold) and/or stationary (e.g., currently motionless but capable of moving at a future time (e.g., parked vehicles, standing pedestrians, etc.)) may not have predicted trajectories since such objects are not moving. However, despite lacking a trajectory that overlaps with the vehicle trajectory (since the object does not have a predicted trajectory), such objects may still be relevant. That is, the position of such objects (e.g., temporarily stationary vehicles around junctions, pedestrians around crosswalks, pedestrians with intents of jaywalking, etc.) may cause the object to be relevant since such objects may resume movement at any time. Consequently, by only tagging objects currently predicted to collide with the vehicle (e.g., object trajectory overlaps with the vehicle trajectory) as relevant, the vehicle may fail to consider the impact and/or potential danger of objects that are considered irrelevant due to being stationary but are actually highly relevant to the safe operation of the vehicle. Accordingly, the limitations to the conventional techniques may result in the vehicle evaluating incomplete and/or inaccurate relevancy data.

To address these and other technical problems and inefficiencies, the system and/or techniques described herein include a relevance filter system (which also may be referred to as a "relevance filter" or "relevance filter component") configured to identify object(s) that are relevant to a vehicle based on generating and/or evaluating artificial path(s) (e.g., a spatial representation of predicted movements of the object based on a heading and/or maximum velocity of the object along navigational routes typically used by the type of object) for the object(s). Technical solutions discussed herein solve one or more technical problems associated with conventional relevance filtering techniques resulting an incomplete and/or an inaccurate representation of the relevant objects proximate the vehicle.

In some examples, the vehicle may receive a route to follow throughout the environment. The vehicle may receive instructions (e.g., transport passengers, deliver items, etc.) to navigate from a starting location to an ending location or destination. Such instructions may be received from a fleet management system, teleoperations system, passenger or passenger device, future passenger, and/or any other source. In some instances, offline and/or on-vehicle components may determine a route through the environment. The route may be a path through an environment from the start location and the end location. Further, the route may be determined based on map data, such as road network data, road topography data, lane segment data, any/or any other data.

In some examples, the vehicle may receive map data associated with the region of the environment between the starting and ending locations. The map data may include information (e.g., static information) about the environment. Such information may include road information (e.g., road locations, road segment identifiers, reference line information (e.g., location, shape, length, curvature, angle, distance to the road boarder, etc.), object information (e.g., locations, object type, object identifier, etc.), and/or other types of information. In other examples, the map data may include identifiers that indicate one or more regions of interest. Such regions may include crosswalks, intersections, and/or any other location.

In some examples, the vehicle may generate a discretized representation of the map data. The vehicle may break down (or otherwise divide) the map data into one or more cells (or polygons) representing regions of the environment (or regions of interest within the environment). In some examples, the vehicle may determine any number of cells having any dimension, shape, and/or size (e.g., 10×10 meters, 20×20 meters, 10×20 meters, etc.). The vehicle may generate or otherwise determine the cells with reference to a global or local reference frame. As such, the location of each cell may be associated with an x-y coordinate or a range of x-y coordinates. For example, a cell may be represented as including a region of the environment spanning multiple x-coordinates and multiple y-coordinates. In some examples, as the cells represent and/or cover a region of the environment, such cells may include information about the objects and/or the features of the environment (e.g., regions of interest) which are located within region of the environment covered by the cell. In such instances, a cell may have a cell identifier which corresponds to features and/or elements of the environment (e.g., located within the cell). For example, a cell identifier may correspond to a region of interest found within the region of the environment covered by the cell.

In some examples, the vehicle may receive sensor data from portion(s) of the environment associated with region(s) of interest. The vehicle may store a list of one or more region(s) of the environment that may be considered a region of interest. A region of interest may be any region where an object may navigate that can subject the vehicle to a potential interaction. For example, regions of interest may include junctions (or intersections), crosswalks, and/or any other region. Further, the vehicle can include additional regions in the list based on historical data. That is, the vehicle may evaluate historical data to identify regions which may lack road designations (e.g., crosswalks, etc.), but which object(s) in environment may still use. For example, the vehicle may analyze historical data to identify one or more locations in an environment that pedestrians use for jaywalking (e.g., cross the road without the use of a crosswalk). As such, the vehicle may include the jaywalking location in the list as a region of interest. In such instances, the list of regions of interests may be added to (or otherwise incorporated in) the map data as regions of interest. Accordingly, when capturing sensor data from one or more sensor devices of the vehicle, the vehicle may access the map data, identify the regions of interest that are within a threshold distance from the vehicle, and target such regions with the sensor devices. That is, the vehicle may receive sensor data representative of a portion of the environment within and/or proximate to the regions of interest.

In some examples, the vehicle may detect an object based on the sensor data. That is, the vehicle may analyze the sensor data and detect one or more objects in the environment. In some cases, the vehicle may identify an x-y coordinate representing the position of the object with respect to a local reference frame and/or global reference frame. As indicated above, the object(s) may be located within and/or proximate to one of the listed regions of interest. The vehicle may determine whether the object(s) are within the region of interest by projecting the location of the object into the discretized map data and determining whether the cell within which the object is located corresponds to a region of interest.

Accordingly, the vehicle may determine which cell of the discretized map data the object is located within (or at least partially within). That is, the vehicle may access the discretized map data and determine which of the multiple cells the object is located within or at least partially within. As described above, cells may cover a region of the environment, and as such may include a range of x-y coordinates. As such, the vehicle may project the location (e.g., the coordinates) of the object into the discretized map data and determine which cell (e.g., range of x-y coordinates) the x-y coordinate of the object falls within.

In some examples, the vehicle may determine that the object is within a region of interest based on the object being within a cell. That is, the vehicle may determine that the object is associated with a region of interest by being located within a region of interest and/or located within a threshold distance from an edge or center of the region of interest. In some examples, based on the cell within which the object is located, the vehicle may identify region(s) of interest within the cell. Further, the vehicle may determine whether the object is located within a portion of the environment encompassed by the region of interest, whether the object is located within a threshold distance from the region of interest, or whether the object is approaching the region. If the object is within the region of interest, approaching the region, or within a threshold distance from the region of interest, the vehicle may determine that the object is considered within or otherwise associated with the region of interest. In contrast, if the object is outside of the region of interest, moving away from the region, and/or outside the threshold distance from the region of interest, the vehicle may determine that the object is not associated with the region of interest.

Additionally or alternatively, the vehicle may identify object(s) of interest based on the level of uncertainty of the object. That is, the vehicle may analyze the sensor data to determine an intent and/or a level of uncertainty of the object intent. In some cases, if the level of the intent uncertainty satisfies a threshold (e.g., meets or exceeds a threshold), the vehicle may determine that the object may have a high level of uncertainty and as such, the vehicle may identify the object as an object of interest (e.g., potentially relevant) despite not being located within a region of interest. In contrast, if the level of intent uncertainty fails to satisfy a threshold (e.g., below a threshold), the vehicle may determine that the object has a low level of uncertainty and as such, the vehicle may indicate that the object is not an object of interest (e.g., not relevant). Examples of highly uncertain objects may include animals, pedestrians with an intent of jaywalking, etc.

Additionally or alternatively, the vehicle may determine that a detected object is associated with a region of interest by determining that the object is predicted to be approaching the region of interest. That is, the vehicle may use map data to identify regions of interest (or priority regions) along the route of the vehicle. In such cases, the vehicle may receive sensor data proximate the region of interest and detect one or more objects based on the sensor data. In such cases, the vehicle may determine a predicted direction of travel for the object(s) and/or a predicted trajectory for the object(s). Based on these predictions (e.g., the direction of travel and/or the trajectory), the vehicle may determine whether the object(s) are predicted to be approaching a region of interest. Based on determining that the object is approaching the region of interest, the vehicle may determine that the object is associated with the region of interest and may be potentially relevant to the future, safe operations of the vehicle. As such, the vehicle may perform additional analysis on such objects to determine whether such objects are relevant.

In some examples, based on the object(s) being located within (or otherwise associated with) the region of interest, approaching the region of interest, and/or having a high level of uncertainty, the vehicle may cause such object(s) to be included in a path-based relevance filter and/or a trajectory-based relevance filter. That is, the vehicle may input the vehicle data, sensor data, and/or object data into the trajectory-based relevance filter and receive a list of one or more relevant objects which may be used to plan the future actions of the vehicle. The trajectory-based relevance filter may generate a predicted trajectory to associate with the object based on the current kinematics (e.g., velocity, acceleration, etc.) of the object, and evaluate the predicted trajectory to determine whether the object is relevant to the vehicle. Techniques for identifying relevant objects may be found, for example, in U.S. patent application Ser. No. 18/132,289 entitled "Machine-Learned Model for Detecting Object Relevance to Vehicle Operation Planning" filed on Apr. 7, 2023, and in U.S. patent Ser. No. 17/854,269 entitled "Identifying Relevant Objects Within an Environment," filed on Jun. 30, 2022, the entire contents of both are hereby incorporated by reference herein for all purposes. In addition to the trajectory-based relevance filter described above, the vehicle may input the object into a path-based relevance identifier. As described below, the path-based relevancy identifier may build (or generate) artificial paths for the object(s), determine whether such artificial path(s) are predicted to interact with the vehicle, and determine, based on whether the object is predicted to interact with the vehicle, a level of relevancy using the artificial path(s).

For example, the vehicle may generate an artificial path for the object(s) based on the object(s) being located within the region of interest. A path may be a spatial representation (e.g., a list of x-y coordinates) of the predicted movements of the object without temporal information (whereas a trajectory has spatial and temporal data). An artificial path may be a path that is not representative of a current velocity of the object or a predicted trajectory of the object. Further, an artificial path may be a path that is generated regardless of its relative likelihood (of being used) and/or the most likely path. For example, despite an object having a limited trajectory due to the limited velocity of the object, the vehicle can generate an artificial path that extends larger distances and/or in different directions than the predicted trajectory. That is, an object may have a predicted trajectory that is indicative of the object traveling five meters within a predetermine time frame due to the limited velocity of the object. However, the vehicle can generate an artificial path that extends 50 meters in various directions. Further, the vehicle may generate a single artificial path for the object; however, in other examples, the vehicle may generate multiple artificial paths for the object and such path(s) may include branches (e.g., the single path may split into two or more separate paths).

In some examples, when generating the artificial path(s) for an object(s), the vehicle may classify the object (e.g., vehicle, cyclist, pedestrian, etc.). Based on the object classification (or classification type), the vehicle may build a path along navigational routes likely used by such an object type (or classification). That is, if the object is a vehicle parked on the side of a road, the autonomous vehicle may generate a path along the road (e.g., a navigational route commonly used by vehicles) in a direction of travel corresponding to the heading of the object. If the object is a pedestrian, the vehicle may generate a path along the sidewalk, jaywalking, and/or crossing a crosswalk (e.g., navigational routes commonly used by pedestrians). In some examples, the length of the artificial paths may be determined based on a maximum velocity of the road (e.g., the speed limit) or the maximum velocity of the object multiplied with a specified time horizon (e.g., three seconds, eight seconds, 10 seconds, etc.). For example, if the speed limit of a road is 35 miles per hour, the vehicle may determine a distance indicating how far the object (classified as a vehicle) may travel if the vehicle were to travel at 35 mph for the time horizon (or other heuristically determined maximum speed). In such cases, the length of the artificial path may correspond to the distance.

Based on generating the artificial path(s), the vehicle may determine whether the artificial path of the object and the trajectory of the vehicle cause the object and the vehicle to overlap within an occupancy map. In some examples, the vehicle may generate an occupancy map (or occupancy grid). An occupancy map may be a map or grid that covers a region of the environment, discretized into a plurality of cells, and indicates whether the object or the vehicle are predicted to occupy a cell at any point. That is, the occupancy map may be a discretized grid that covers the region of the environment upon which the vehicle navigates. The occupancy map represents portions of the environment that cover the vehicle's trajectories (e.g., current trajectory and/or candidate trajectories). In some examples, the vehicle may generate an occupancy grid that based on a predefined length and width (e.g., 100 meters×20 meters, etc.). The occupancy map may include various object(s) within the environment.

In some examples, the vehicle may determine which cell(s) of the occupancy map the object is predicted to occupy and which cells of the occupancy map the vehicle is predicted to occupy. That is, the vehicle may determine a spatial overlap of the cells for the vehicle and for the object. In such cases, the vehicle may determine a list of one or more cells in the occupancy map that the object is predicted to occupy (e.g., spatially) based on the x-y coordinates of the artificial path. An artificial path may include one or more states which may represent the predicted pose (e.g., position (e.g., x-y coordinate) and/or heading) of the object along the artificial path. As such, the vehicle may identify, at each state of the artificial path, which cell(s) the object is predicted to occupy. The vehicle may tag such cell(s) as potentially occupied by the object. Further, the vehicle may determine which cells of the occupancy map that the vehicle is predicted to occupy (e.g., spatially) based on the x-y coordinates of the trajectory of the vehicle. That is, a trajectory may include one or more states that represent the predicted vehicle state (e.g., pose data, velocity data (e.g., minimum and maximum), etc.) of the vehicle. As such, the vehicle may identify, for each state of the trajectory, which cell(s) of the occupancy map the vehicle is predicted to occupy and the vehicle may tag such cell(s) as being potential occupied by the vehicle.

Based on determining which cells of the occupancy map the vehicle and the object are predicted to occupy, the vehicle may determine whether the vehicle and the object are predicted to occupy one or more of the same cells. That is, the vehicle may evaluate the cells of the occupancy map and determine whether there are any cells that have been identified (or tagged) as being occupied by the object and the vehicle. If a cell has been tagged as being occupied by both the object and the vehicle, the vehicle may indicate that there is a potential spatial overlap with the object of interest.

Based on the vehicle and the object occupying a same cell of the occupancy map, the vehicle may determine whether the object and the vehicle occupy the cell within a similar range of times. That is, the vehicle may determine whether the object can affect the decision making of the vehicle which may be indicative of a temporal overlap at the cell at which there is a spatial overlap. An object may not affect the vehicle's decision making if a minimum time of arrival of the object to the cell is greater than a maximum time of arrival of the vehicle at the same cell plus a buffer of time (e.g., $t_{object\_min} > t_{vehicle\_max} + \Delta t$). That is, if the vehicle passed the location of the cell prior to the arrival of the object, the vehicle may determine that the object does not affect the way in which the vehicle operates and that there may not be a temporal overlap. However, if the object arrives to the cell prior to the vehicle or at the same time as the vehicle, the vehicle may determine that the object can affect the way in which the vehicle operates and that there may be a temporal overlap. As such, the vehicle may determine time values (e.g., minimum arrival time and/or maximum arrival time) corresponding to when the object may be located at or within a specific cell of the occupancy map. In some examples, the vehicle may determine, based on the artificial path, a minimum and/or maximum arrival time based on the object's dynamics and/or capabilities (e.g., maximum and minimum accelerations, maximum and minimum velocities, current velocity, current steering angle, current heading angle, maximum and minimum steering angles/rates, etc.). In some examples, the vehicle may determine, based on the vehicle's trajectory, a minimum and/or maximum arrival time based on the object's dynamics and/or capabilities (e.g., maximum and minimum accelerations, maximum and minimum velocities, current velocity, current steering angle, current heading angle, maximum and minimum steering angles/rates, etc.). That is, each state of the trajectory may include time data which may indicate a predicted maximum and/or minimum time arrival at the location of the state.

Based on the object of interest overlapping with the vehicle spatially and temporally, the vehicle may determine a relevance score of the object. A relevance score may indicate the degree (or level) of relevance of the object with respect to the vehicle. The relevance score may increase when the overlap (or potential collision) is predicted to occur sooner (e.g., the sum of $t_{object\_min}$ and $t_{vehicle\_min}$ is low). In contrast, the relevance score may decrease when the sum of $t_{object\_min}$ and $t_{vehicle\_min}$ increases (i.e., when the interaction occurs later). In such examples, the vehicle may determine scores (or sub-scores) that represent the relevance of the object at each state located within the overlapping cell. In at least some examples, the score may be an exponential of a product of a weight and the sum (such that the score is proportional to $e^{-w*(t_{object\_min} + t_{vehicle\_min})}$). Based on identifying the sub-scores for each state in the cell, the vehicle may determine the overall relevance score as the highest sub-score. That is, the maximum sub-score may be the overall relevance score for the object.

In some examples, the vehicle may send data associated with a number of the object(s) with the highest relevance scores and/or scores which meet or exceed a threshold relevance score to a prediction and/or planning component. The vehicle may determine a threshold number of object(s) which may be sent to prediction and/or planning components. In such cases, the vehicle may identify the object(s) with the highest relevance scores that are above the threshold number. The identified object(s) may be sent to the prediction and/or planning components for further processing and may ultimately be used to control the vehicle. In some examples, the number of object(s) to send to the prediction and/or planning components may be based on an amount of processing power and/or memory available for a processing operation (e.g., to ensure that a number of object(s) can be considered within a particular period of time).

In addition to sending the artificial path-based relevance filter results to prediction and/or planning, the vehicle may also send one or more objects that have been identified as relevant by the trajectory-based relevance filter. In some cases, despite the trajectory-based relevance filter determining that an object is irrelevant, the vehicle may still send the object to prediction and/or planning components based on the artificial path-based relevance filter determining that such an object may be relevant or otherwise has some safety-related characteristic (e.g., emergency vehicles, pedestrians, etc.).

In some examples, the prediction and planning components may further analyze the object(s) and determine actions for the autonomous vehicle to perform. For instance, the planner component may analyze the object(s) and the associated artificial paths that are relevant to the autonomous vehicle, but not analyze objects that are irrelevant to the autonomous vehicle, such as objects that do not include potential interactions with the vehicle or other objects that interact with the vehicle. This may reduce the amount of computing resources required by the prediction and planner components to determine the actions for the autonomous vehicle and/or allow more computing resources to be dedicated to provide enhanced determinations regarding those relevant objects. Additionally, this may reduce the time it takes for the planner component to determine the actions. Reducing the time it takes for the planner component to determine the actions may increase the overall safety of the vehicle when navigating around the environment. Alternatively, compute resources that may otherwise have been dedicated to irrelevant objects may be dedicated to relevant objects to provide for increased precision in predictions, etc.

As illustrated by these examples, the techniques described herein can improve the functioning, safety, and efficiency of autonomous and semi-autonomous vehicles traversing through driving environments by using artificial paths to identify relevant objects more efficiently and accurately within an environment. The relevance filter described herein may improve vehicle safety and driving efficiency by improving the accuracy of identifying relevant objects based on generating artificial paths for objects (slow moving objects) and determining whether the object(s) are relevant based on the artificial path. The improved identifying of relevant objects by the relevance filter can be used to predict object actions more efficiently and accurately, and determine safe trajectories for the autonomous vehicle.

In further examples, by performing the processes describe herein, the autonomous vehicle may reduce the number of objects that the planner component analyzes when determining actions for the autonomous vehicle to perform. By reducing the number of objects to consider, the relevance filter may reduce the size of data to be processed. Further, the techniques discussed herein can reduce an amount of processing time without reducing an accuracy (or by minimizing any reduction of accuracy) of identifying relevant objects, which can reduce a latency of processing systems. Reducing latency can improve safety outcomes and/or comfort levels by controlling an autonomous vehicle, for example, to alter a trajectory or otherwise navigate the autonomous vehicle safely in an environment The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for identifying relevant objects based on artificial paths. As shown in this example, some or all of the operations in the example process 100 may be performed by a relevance filter component, perception component, prediction component, a planning component, and/or any other component or systems within an autonomous vehicle. For instance, as shown in this example, example process 100 may be implemented using a relevance filter component 102. As described below in more detail, the relevance filter component 102 may include various components, such as a discretizing component, a region of interest determining component, an artificial path generating component, an interaction component, a relevance score generating component, and/or a relevant object determining component.

At operation 104, the relevance filter component 102 may determine that an object is associated with a region of interest. The relevance filter component 102 and/or other components within the perception component of the vehicle may detect objects within the environment based on sensor data. When determining whether such object(s) are relevant to the vehicle, the relevance filter component 102 may determine whether such object(s) are located within (or otherwise associated with) a region of interest (e.g., a crosswalk, an intersection, etc.) or are otherwise approaching a region of interest. For example, box 106 illustrates an autonomous vehicle 108 navigating a driving environment and approaching a junction (or intersection) including a detected object. In this example, proximate the junction may include an object 110. As shown in box 106, the object 110 may be a pedestrian; however, in other examples, there may be more or fewer objects. Further, in other examples, the objects may be a vehicle, an animal, a cyclist, and/or any other type of dynamic object that may be capable of movement.

In some examples, the relevance filter component 102 may determine whether the object 110 is located within a region of interest or whether the object 110 is approaching the region of interest. The relevance filter component 102 may determine whether the object 110 is within or proximate a region of interest by projecting a location of the object 110 into a discretized representation of map data. That is, the relevance filter component 102 may discretize map data into various polygons (or cells) that cover regions of the physical environment. In such cases, some cells of the discretized map data may be associated with a region of interest. As such, based on identifying the location (e.g., x-y coordinate) of the object 110, the relevance filter component 102 may project the x-y coordinate of the object 110 into the discretized map data. As such, based on the cell the object is located in, the relevance filter component 102 may determine that the object is within a region of interest. For example, as shown, box 106 may include a polygon (or cell) that encompasses a region of interest 112. In this case, the region of interest 112 may be an intersection. Further, as shown, the object 110 may be located within the bounds of the region of interest 112. As such, the relevance filter component 102 may determine that the object 110 is located within a region of interest. However, though this example describes the object 110 being associated with the region of interest 112 based on being located within the region of interest, the relevance filter component 102 may determine that the object 110 is associated with the region of interest 112 based on the object 110 approaching the region of interest 112.

At operation 114, the relevance filter component 102 may generate a potential (or artificial) path (e.g., a path regardless of its relative likelihood of being followed by the object 110 and/or the most likely path) for the object 110 based on the object 110 being associated with the region of interest 112. That is, since the relevance filter component 102 has determined, at operation 104, that the object 110 is located within a region of the environment that is of particular interest to the vehicle 108, the relevance filter component 102 may determine whether object 110 is relevant to the vehicle 108 and specifically to the future actions of the vehicle 108. In making such a determination, the relevance filter component 102 may generate artificial path(s) for the object 110 which may be used to determine if the object 110 has a potential to interact with the vehicle 108. For example, box 116 illustrates the object 110 with a plurality of artificial paths. In this example, the object 110 may include an artificial path 118 and an artificial path 120. As shown, the artificial path 118 may instruct or otherwise lead the object 110 across a first crosswalk. The artificial path 120 may instruct or otherwise lead the object 110 across a second crosswalk. The relevance filter component 102 may determine such artificial paths by classifying the object 110 as a pedestrian and identifying navigational routes a pedestrian may historically use to travel upon (e.g., crosswalk, sidewalk, etc.). In this example, the relevance filter component 102 may identify the first crosswalk and the second crosswalk and determine that such crosswalks are navigational routes upon which a pedestrian may travel. As such, the relevance filter component 102 may generate artificial paths along such navigational paths. The length of such artificial paths (e.g., specifically for the pedestrian) may be based on a maximum velocity of the object 110 multiplied with a specified time horizon and a width may be based on any one or more of a width of the pedestrian (which may be inflated), a width of the region, or the like. In this example, the relevance filter component 102 may determine a maximum velocity for the object 110 and multiply the maximum velocity with the designated time horizon, the result being the length of the artificial paths.

At operation 122, the relevance filter component 102 may determine that the vehicle 108 and the object 110 may overlap at a cell of an occupancy map. That is, to determine whether the object 110 is relevant to the vehicle 108, the relevance filter component 102 may determine whether the object 110 and the vehicle 108 interact at a future time. The relevance filter component 102 may make such a determination by generating an occupancy map and determining whether the artificial path(s) of the object 110 and a trajectory of the vehicle 108 cause the object 110 and the vehicle 108 to overlap at one or more cells of the occupancy map physically and temporally. For example, box 124 illustrates an occupancy map 126 indicating which of the plurality of cells the object 110 and/or vehicle 108 are projected to occupy. In this example, the occupancy map 126 may include three columns and five rows; however, in other examples, the occupancy map 126 may include more or less columns and/or rows. Furthermore, the discretization of the map may vary and the data stored in the cells of the occupancy map vary. That is, the cells may store probability data indicative of whether the object 110 and/or the vehicle 108 are predicted to be located in the cell; however, in other examples, the cells may store a binary indication (e.g., "yes" or "no") describing if the object 110 and/or the vehicle 108 are predicted to be located in the cell at any point in time.

In some examples, the relevance filter component 102 may determine whether the object 110 and the vehicle 108 physically (or spatially) occupy one or more of the same cells of the occupancy map 126. As shown in box 124, the relevance filter component 102 may evaluate each state of the artificial path 120 and of the trajectory of the vehicle 108. At each state of the artificial path 120, the relevance filter component 102 may determine which cell the object 110 is predicted to be located within. The relevance filter component 102 may tag such cells as being cells within which the object 110 is predicted to be located within based on the object 110 following the artificial path 120. Further, the relevance filter component 102 may determine which cells the vehicle 108 is predicted to be located within at each state of the vehicle trajectory. The relevance filter component 102 may tag such cells as being cells within which the vehicle 108 is predicted to be located within based on the vehicle 108 following the trajectory. As shown in the occupancy map 126, the relevance filter component 102 may highlight such occupied cells in a light grey. Further, the relevance filter component 102 may highlight the cells within which both the object 110 and the vehicle 108 are predicted to occupy with a darker grey. As such, the cell 128 may be indicative of a cell that the object 110 and the vehicle 108 are predicted to occupy. Thus, the relevance filter component 102 may determine that the object 110 and the vehicle 108 are predicted to spatially overlap at the cell 128.

Based on the object 110 and the vehicle 108 overlapping at cell 128, the relevance filter component 102 may determine whether the object 110 and the vehicle 108 temporally overlap at the cell 128. That is, the relevance filter component 102 may determine whether the object 110 can affect the vehicle's decision making. If the object 110 can affect the vehicle's decision making, the relevance filter component 102 may determine that the object 110 is relevant to the vehicle 108. In some examples, the relevance filter component 102 may determine that the object 110 does not affect the decision making of the vehicle 108 if a minimum time of arrival (e.g., the fastest the object can arrive at the cell 128) of the object 110 to the cell 128 is greater than a maximum time (e.g., the slowest the vehicle 108 can arrive at the cell 128 based on the trajectory) of arrival of the vehicle 108 at the cell 128 (e.g., $t_{object\_min} > t_{vehicle\_max}$). As such, the relevance filter component 102 may determine the minimum time to arrival 130 for the object 110 and determine the maximum time to arrival 132 for the vehicle 108. In this example, the relevance filter component 102 may determine that the minimum time to arrival 130 of the object 110 may be 1.3 seconds and the maximum time to arrival 132 of the vehicle 108 may be 2.1 seconds. As such, based on the minimum time to arrival 130 (e.g., $t_{object\_min}$) being 1.3 seconds which is less than the maximum time to arrival 132 (e.g., $t_{vehicle\_max}$) of 2.1 seconds, the relevance filter component 102 may determine that the object 110 may affect the decision making of the vehicle 108 and as such, the relevance filter component 102 may determine that the object 110 may be relevant to the vehicle 108.

At operation 134, the relevance filter component 102 may control the vehicle 108 based on determining a relevance score for the object 110 based on the spatial and temporal overlap described in operation 122. The determine the degree to which the object 110 is relevant to the vehicle 108, the relevance filter component 102 may determine one or more sub-scores at each state located within the overlapping cell 128. In some examples, the relevance filter component 102 may determine the sub-scores by determining the minimum time to arrival 130 and determining a minimum time to arrival of the vehicle 108 and combining such values. Based on determining such sub-scores, the relevance filter component 102 may assign the highest sub-score as the overall relevance score for the object 110. In such cases, the relevance filter component 102 send such data to one or more downstream prediction and/or planning components. In such cases, the prediction and/or planning components may determine and/or plan the actions of the vehicle based on the relevance of the object 110. For example, box 136 illustrates the object 110 having navigated across the crosswalk. In this example, due to the high relevance of the object 110, the planning components may select or otherwise cause the vehicle 108 to follow a trajectory that yields to the object 110 such as to provide adequate time for the object 110 to cross the road.

Figure 2:
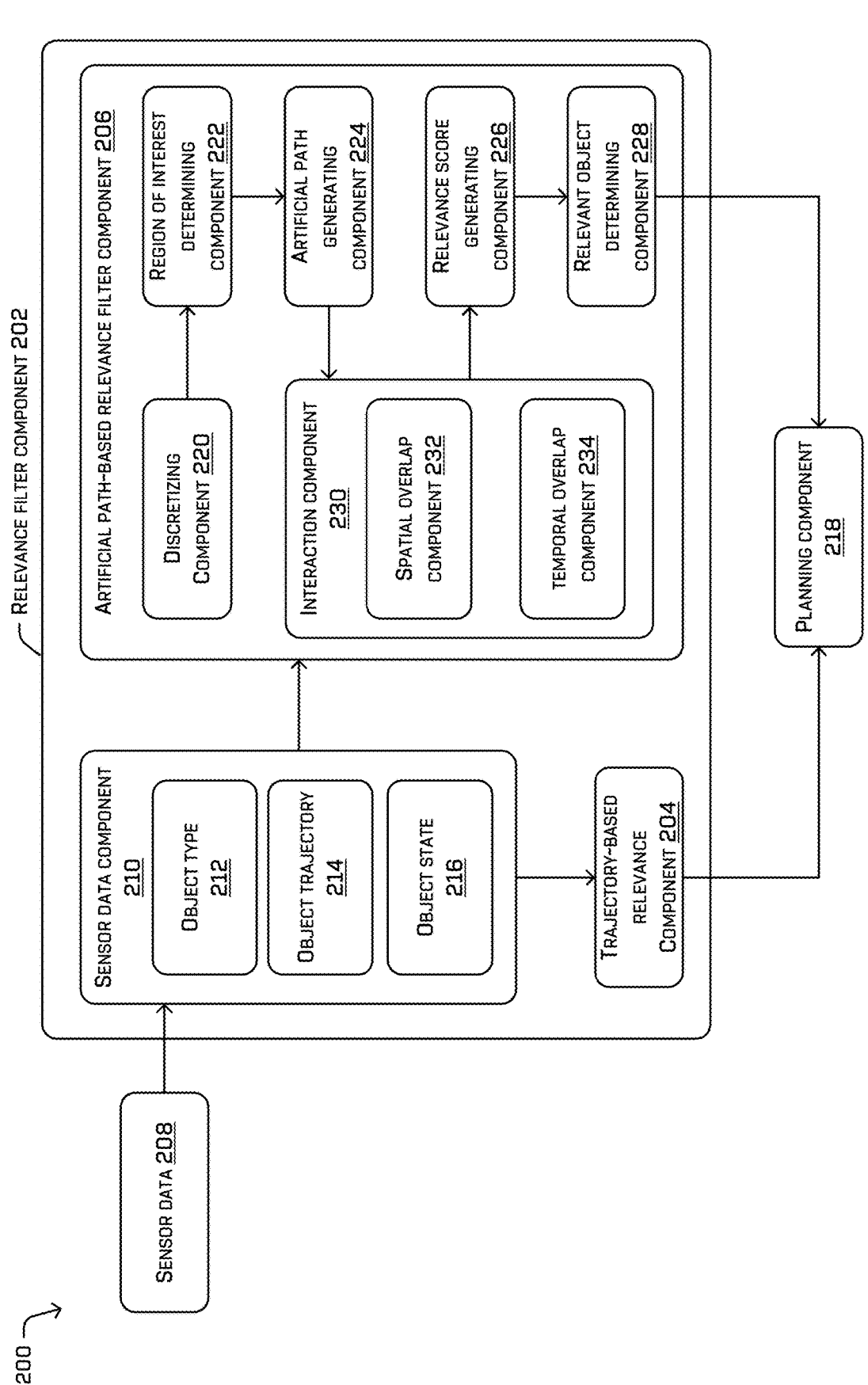
FIG. 2 illustrates an example computing system including a relevance filter component configured to identify relevant object(s) based on a trajectory-based relevance filtering technique and based on an artificial path-based relevance filtering technique, in accordance with one or more examples of the disclosure.

FIG. 2 illustrates an example computing system 200 including a relevance filter component 202 configured to identify relevant object(s) based on a trajectory-based relevance filtering technique and an artificial path-based relevance filtering technique.

In some examples, the relevance filter component 202 may be similar or identical to the relevance filter component 102 described above, or in any other examples herein. As noted above, in some cases the relevance filter component 202 may be implemented within or otherwise associated with a perception component, prediction component, and/or planning component of an autonomous vehicle. In some examples, the relevance filter component 202 may include various components, described below, configured to perform different functionalities of a path-based relevancy technique. In some examples, the relevance filter component 202 may include a trajectory-based relevance component 204 configured to identify relevant objects based on a predicted trajectory of an object and a vehicle trajectory and/or an artificial path-based relevance filter component 206 configured to identify relevant objects based on generating and/or evaluating artificial path(s) of the object(s).

In some examples, the relevance filter component 202 may receive sensor data 208 from one or more sensor devices within (or otherwise associated with), perception components, and/or prediction components of the autonomous vehicle. As shown in FIG. 2, the sensor data 208 may be sent to the sensor data component 210. In such instances, the sensor data 208 may represent a current driving scenario and/or driving condition proximate the vehicle. A driving scenario may include vehicle information (e.g., trajectory data, (e.g., velocity, acceleration steering angle, etc.), pose data, etc.), object information (e.g., a trajectory of the object(s), a pose of the object(s), a number of object(s), a type of the object(s), a past trajectory of the object(s), etc.) and/or any other information.

In some examples, the sensor data component 210 may include one or more subcomponents associated with different types of data contained in the sensor data 208. As illustrated in FIG. 2, the sensor data 208 may include object type data, object trajectory data, and/or object state data. However, this is not intended to be limiting; in other examples, the sensor data 208 may include more or less types of data. As shown, the sensor data component 210 may include an object type component 212 configured to receive, store, and/or synchronize object type data indicative of the type or classification of object(s) within the environment, an object trajectory component 214 configured to receive, store, and/or synchronize object trajectory data indicative of the predicted trajectory of the object(s) in the environment, and/or an object state component 216 configured to receive, store, and/or synchronize object state data which may indicate the state (e.g., pose (e.g., position and/or heading), velocity, acceleration, etc.) of the object. In some examples, the sensor data component 210 may send the data stored therein to the trajectory-based relevance component 204 and to the artificial path-based relevance filter component 206.

In some examples, the relevance filter component 202 may include a trajectory-based relevance component 204 configured to identify relevant objects based on a predicted trajectory of an object and a vehicle trajectory. As indicated above, the trajectory-based relevance component 204 may receive sensor data 208 from the sensor data component 210. In some examples, the trajectory-based relevance component 204 may determine which object(s) in the environment are relevant to the vehicle by identifying object(s) that are predicted to collide with the vehicle based on the object trajectory (as stored in the object trajectory component 214) and the vehicle trajectory. Techniques for identifying relevant objects may be found, for example, in U.S. patent application Ser. No. 18/132,289 entitled "Machine-Learned Model for Detecting Object Relevance to Vehicle Operation Planning" filed on Apr. 7, 2023, and in U.S. patent Ser. No. 17/854,269 entitled "Identifying Relevant Objects Within an Environment," filed on Jun. 30, 2022, the entire contents of both are hereby incorporated by reference herein for all purposes. In some cases, the trajectory-based relevance component 204 may identify one or more relevant objects proximate the vehicle. As such, the trajectory-based relevance component 204 may send such relevant objects to the planning component 218 for further processing.

In some examples, the relevance filter component 202 may include an artificial path-based relevance filter component 206 configured to identify relevant objects based on generating and/or evaluating artificial path(s) of the object(s). As shown, the artificial path-based relevance filter component 206 may include one or more subcomponents such as a discretizing component 220, a region of interest determining component 222, an artificial path generating component 224, an interaction component 230 including a spatial overlap component 232 and a temporal overlap component 234, a relevance score generating component 226, and/or a relevant object determining component 228.

In some examples, the discretizing component 220 may be configured to generate a discretized representation of map data. In some examples, the discretizing component 220 may receive the map data from an external map server, and/or may store the map data in an internal storage. For instance, the autonomous vehicle may request or receive map data from a remote map server, based on the route for the vehicle to travel, and store one or more maps locally on the vehicle. In some examples, map data can include any number of data structures, modeled in two or more dimensions that are capable of providing information about the environment, such as, but not limited to, road network data, topologies, intersections, streets, roads, crosswalks, terrain, and the environment in general. The map data may also represent various map features within the environment along the route, including but not limited to roads, lanes, curbs, shoulders, crosswalks, buildings, medians, street signs, traffic signs, speed limits, etc.

In some examples, the discretizing component 220 may discretize the map data into one or more polygons (or cells). The discretizing component 220 may receive map data from one or more components of an autonomous vehicle and discretize the data into one or more cells which may represent one or more regions of an environment. The discretizing component 220 may perform such functions by a remote server-based system during a pre-computation stage and/or prior to the vehicle moving throughout the environment. A pre-computation stage may be a moment in which the vehicle turns on, initializes, and/or any other situation. Discretizing the map data during a pre-computation stage may enhance processing speeds, as the vehicle may not have to determine a discretize map data upon detecting each object. Rather, as the discretized map is determined offline, upon detecting an object, the vehicle may access the already discretized map data to determine within which cell the object is found, such as by storing the discretized map data in a memory of the vehicle or in a memory otherwise accessible to the vehicle (e.g., such as via a network connection).

In some examples, the discretizing component 220 may generate or otherwise discretize map data including one or more cells. A cell may represent a region of the environment. In such instances, such regions may be associated with a region type (e.g., road, driving lane, intersection, crosswalk, etc.). Such region types may also include regions of interest such as intersections and crosswalks. In some examples, the dimensions of the cells may be the same or different. In some examples, the cells may be associated with a range of x-y coordinates based on a local and/or global reference frame. For example, a cell may cover a region spanning multiple x-coordinates and multiple y-coordinates (e.g., cell coordinates include (0-5, 0-5)).

In some examples, the region of interest determining component 222 may be configured to determine whether one or more objects are located within a region of interest. In such cases, each cell of the discretized map data may be associated with a region type and as such, if the region type with which the object is associated is a region of interest, the object may be associated with a region of interest. In such instances, the region of interest determining component 222 may project the location of the object into the discretized map data and determine within which cell (or polygon) the object is located. Based on identifying the cell within which the object is located, the region of interest determining component 222 may determine the region type the cell. If the cell is associated with a region of interest, the region of interest determining component 222 may determine that the object is within a region of interest. In contrast, if the cell is not associated with a region of interest (e.g., park, field, etc.), the region of interest determining component 222 may determine that the object is not within a region of interest. Based on the object being within a region of interest, the region of interest determining component 222 may cause the artificial path generating component 224 to generate an artificial path for such object(s).

In other examples, the region of interest determining component 222 may determine that the object is associated with the region of interest based on predicting that the object is approaching the region of interest. As noted above, the region of interest determining component 222 may analyze the object data as stored in the sensor data component 210 to determine or otherwise predict that the object is approaching the region of interest. In some examples, the region of interest determining component 222 may evaluate the object trajectory as stored in the object trajectory component 214 in association with map data to determine if the object is predicted to be navigating to or otherwise approaching the region of interest. If the object approaching the region of interest, the region of interest determining component 222 may cause the artificial path generating component 224 to generate an artificial path for such objects.

In alternative examples, though an object may not be located within or otherwise be approaching a region of interest, the vehicle may determine that the object may still be relevant based on a high uncertainty of the intent of the object. That is, the vehicle may analyze the sensor data to determine an intent and/or a level of uncertainty of the object intent. In some cases, if the level of the intent uncertainty satisfies a threshold (e.g., meets or exceeds a threshold), the vehicle may determine that the object may have a high level of uncertainty and as such, the vehicle may identify the object as an object of interest (e.g., potentially relevant) despite not being located within a region of interest. In contrast, if the level of intent uncertainty fails to satisfy a threshold (e.g., below a threshold), the vehicle may determine that the object has a low level of uncertainty and as such, the vehicle may indicate that the object is not an object of interest (e.g., not relevant). Examples of highly uncertain objects may include animals, pedestrians with an intent of jaywalking, etc. In such cases, such objects may be sent to the artificial path generating component 224.

In some examples, the artificial path generating component 224 may be configured to generate one or more artificial paths for the object(s) located within the regions of interest, for object(s) approaching the region of interest, and/or object(s) with a high degree of uncertainty. When generating the artificial paths, the artificial path generating component 224 may determine the type or classification of the object (as stored in the object type component 212). In such instances, the artificial path generating component 224 may generate artificial paths along navigational routes generally used by the type of object. For example, if the object is a vehicle, the artificial path generating component 224 may generate artificial path(s) along navigational routes used by a vehicle, such as a road or parking lot. If the object is a pedestrian, the artificial path generating component 224 may generate artificial path(s) along navigational routes used by a pedestrian, such as a sidewalk, crosswalk, etc. In some examples, the artificial path(s) may split and/or branch into one or more additional paths. For example, a single artificial path may split into two separate paths representing alternative paths the object may follow. In some examples, the artificial path generating component 224 may send such path(s) to the interaction component 230 to determine whether there is a potential interaction based on the artificial path and the vehicle trajectory.

In some examples, the interaction component 230 may be configured to determine whether the object and the vehicle spatially and/or temporally overlap based on following the artificial path and the vehicle trajectory. As shown, the interaction component 230 may include one or more subcomponents such as a spatial overlap component 232 and a temporal overlap component 234. The spatial overlap component 232 may determine whether the vehicle and the object are predicted to occupy the same cell in an occupancy grid. That is, the spatial overlap component 232 may generate an occupancy grid that includes multiple cells that may identify whether the object and vehicle are predicted to occupy the cell. If the spatial overlap component 232 determines that the occupancy grid includes a cell that is occupied by both the vehicle and the object, the spatial overlap component 232 may determine that the object and vehicle physically overlap within cell. Based on the physical overlapping, the temporal overlap component 234 may be determine whether the object and vehicle overlap at the cell temporally. That is, the temporal overlap component 234 may determine whether the object may affect the decision making of the vehicle and if so, the temporal overlap component 234 may determine that the object is relevant to the vehicle and that the object and vehicle temporally overlap. In such cases, the interaction component 230 may send an indication that the object and the vehicle are predicted to overlap temporally and physically based on following the artificial path and the vehicle trajectory.

In some examples, the relevance score generating component 226 may be configured to generate a relevance score for the object. The relevance score generating component 226 may determine the relevance score according to the following formula:

$$\text{Relevance Score} = \exp(-w^*(t_{object\_min} + t_{vehicle\_min}))$$

In this equation, the Relevance Score may represent the degree to which the object is relevant to the vehicle. W may represent a weight value that is a positive constant controlling the decay rate of the score. $T_{object\_min}$ may represent the minimum time of arrival of the object at the overlapping cell, as described above. $T_{vehicle\_min}$ may represent the minimum time of arrival of the vehicle at the overlapping cell, as described above.

In some examples, the relevant object determining component 228 may be configured to determine which of the objects to send to the planning component 218. That is, the relevant object determining component 228 may determine a threshold number of object(s) which may be sent to the planning component 218. As such, the relevant object determining component 228 may identify the object(s) with the highest relevance scores as determined by the relevance score generating component 226 that are above the threshold number. In such cases, the relevant object determining component 228 may send such object(s) to the planning component 218 for further processing.

Figure 3:
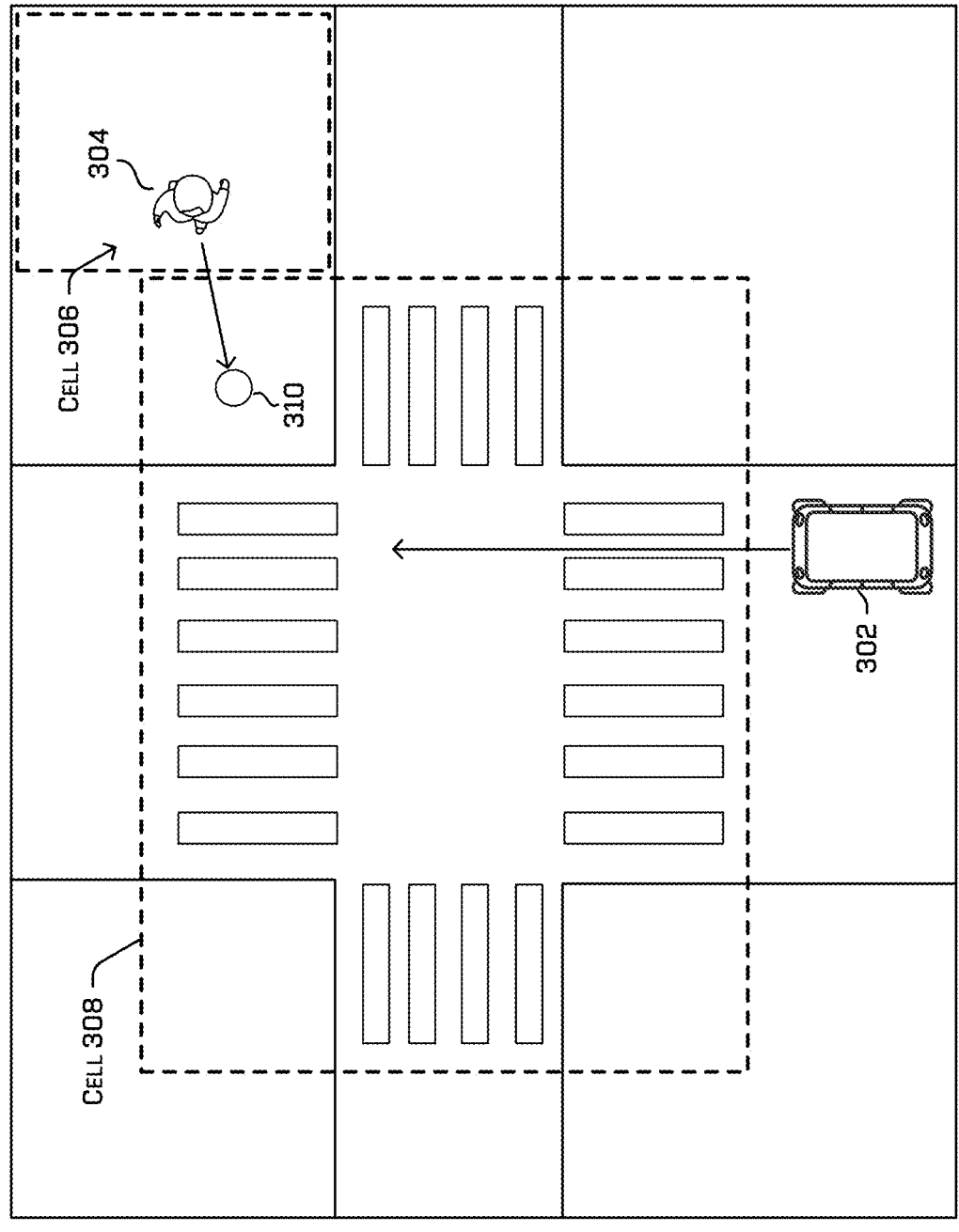
FIG. 3 depicts an example of discretized map data, in accordance with one or more examples of the disclosure.

FIG. 3 depicts an example discretized map data 300. Specifically, FIG. 3 illustrates an object being associated with a region of interest despite being physically located outside of the cell associated with the region of interest.

In this example, the example discretized map data 300 may be similar or identical to the environments illustrated and/or described throughout. As shown, the example discretized map data 300 may include a vehicle navigating an environment approaching an intersection. As shown, the example discretized map data 300 may also include an object 304. In this example, the object 304 may be a stationary pedestrian (e.g., the pedestrian has a limited velocity), however, in other examples, the object 304 may be any other type of stationary object (e.g., an object with a velocity below a threshold).

When planning future actions, the vehicle 302 may determine whether the object 304 is relevant. In such cases, the vehicle 302 may project the location of the object 304 into the discretized map data 300 to determine within which cell the object is located. As shown, the object 304 may be located within a cell 306. In this case, the vehicle 302 may determine the type of region the cell 306 is mapped to. As shown, the cell 306 may be mapped to a sidewalk type of region which may not be a region of interest. However, the vehicle 302 may determine that the adjacent cell 308 may have a region type of an intersection which may be a region of interest. As such, the vehicle 302 may consider the object 304 as being located within the cell 308 (e.g., the region of interest) if the object 304 is within a threshold distance from the boarder or center of the cell 308 or if a current velocity of the object 304 multiplied by the time horizon (e.g., three seconds, six seconds, eight seconds, etc.) results in the object 304 being located within the cell 308. For example, as shown, the vehicle 302 may determine that if the object 304 continues its limited velocity for the period of the time horizon, the object 304 may be located at a position 310 within the cell 308. As such, the vehicle 302 may determine that the object 304 is associated with the cell 308 and/or the region of interest despite being currently located outside of the cell 308 and/or the region of interest.

Though this example describes determining whether the object 304 is located within or capable of being located within the cell 308, in other example, the vehicle 302 may determine that the object 304 may be associated with the region of interest (e.g., intersection, crosswalk, etc.) based on determining that the object 304 is approaching the region of interest. In this example, the vehicle 302 may determine that the object 304 may be predicted to approach the region of interest and as such, the vehicle 302 may associate the object 304 with the region of interest.

Figure 4:
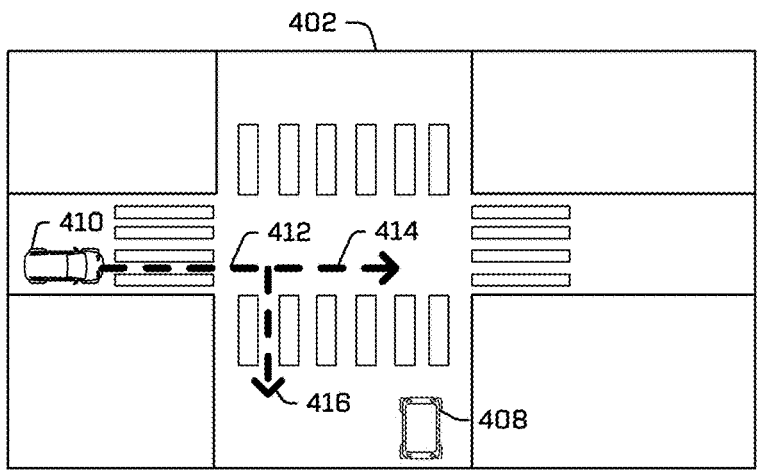
FIG. 4 depicts an example environment with multiple types of objects having multiple artificial paths, in accordance with one or more examples of the disclosure.
Figure 4:
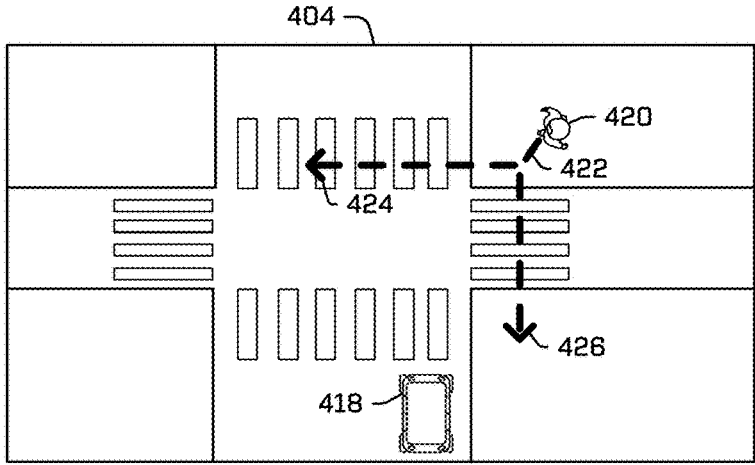
Figure 4:
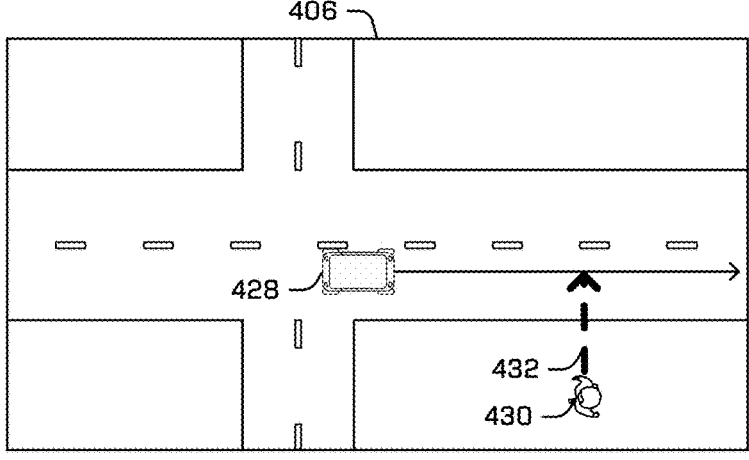

FIG. 4 depicts example environments 400 with multiple types of objects having multiple artificial paths.

As shown, FIG. 4 may include multiple example environments which may include different types of objects and different types of artificial paths. That is, FIG. 4 may include an environment 402 which includes an artificial path for a vehicle, an environment 404 which includes an artificial path for a pedestrian, and an environment 406 which includes an artificial path for a pedestrian with a high uncertainty.

In some examples, the environment 402 may include a vehicle 408 and an object 410. When determining the relevance of the object 410, the vehicle 408 may generate one or more artificial paths for the object 410. When generating such artificial paths, the vehicle 408 may generate such artificial paths along navigational routes which are generally used by the type of object 410. In this situation, the object 410 may be a vehicle and as such, the vehicle 408 may generate artificial paths along the driving lanes of the road (e.g., driving lanes are navigational routes used by vehicles). As shown, the object 410 may have an artificial path 412 that enters the intersection and splits into two different artificial paths, the first split artificial path 414 continuing through the intersection and the second split artificial path 416 performing a right turn maneuver upon entering the intersection. In such cases, the vehicle 408 may consider such artificial paths when determining the relevance of the object 410.

In some examples, the environment 404 may include a vehicle 418 and an object 420. When determining the relevance of the object 420, the vehicle 418 may generate one or more artificial paths for the object 420. When generating such artificial paths, the vehicle 418 may generate such artificial paths along navigational routes which are generally used by the type of object 420. In this situation, the object 420 may be a pedestrian and as such, the vehicle 418 may generate artificial paths along the sidewalk and/or crosswalks (e.g., navigational routes used by pedestrians). As shown, the object 420 may have an artificial path 422 that splits into two different artificial paths, the first split artificial path 424 crossing a first crosswalk and the second split artificial path 426 crossing a second crosswalk. In such cases, the vehicle 418 may consider such artificial paths when determining the relevance of the object 420.

In some examples, the environment 406 may include a vehicle 428 and an object 430. When determining the relevance of the object 430, the vehicle 428 may determine that the object 430 has a high level of uncertainty and as such, the vehicle 428 may generate an artificial path for the object 430 despite the object 430 not being located within a region of interest. In such cases, the vehicle 428 may generate one or more artificial paths for the object 430. As shown, the object 430 may have an artificial path 432 that enters the roadway directly towards the vehicle trajectory. In such cases, the vehicle 428 may consider such artificial paths when determining the relevance of the object 430.

Figure 5:
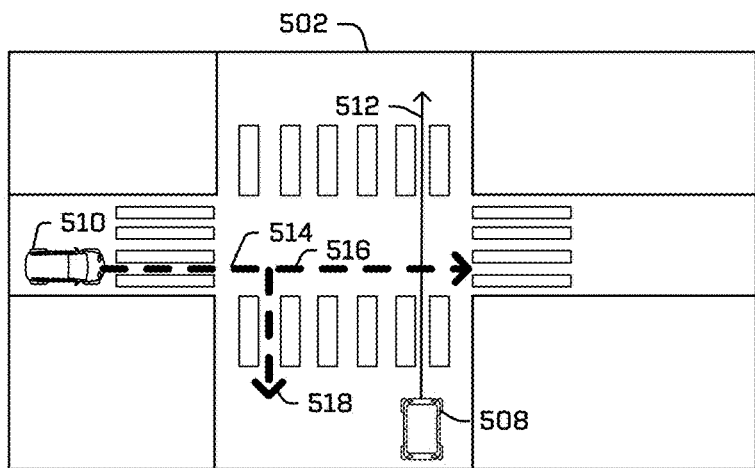
FIG. 5 depicts an example environment and an example occupancy map used to determine whether an object and a vehicle overlap (e.g., spatially and temporally) at a cell of an occupancy map, in accordance with one or more examples of the disclosure.
Figure 5:
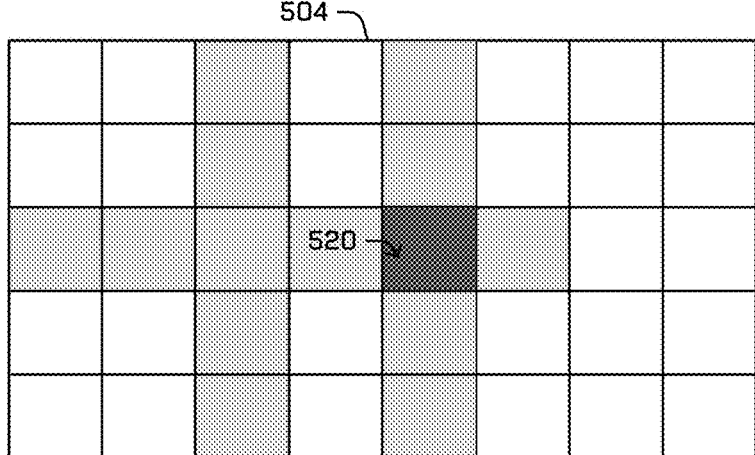
Figure 5:
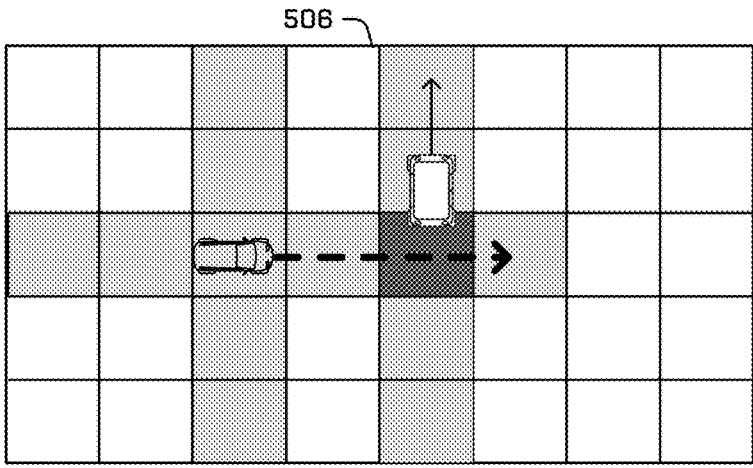

FIG. 5 depicts an example environment 500 and an example occupancy map used to determine whether an object and a vehicle overlap (e.g., spatially and temporally) at a cell of an occupancy map.

In this example, FIG. 5 may include a box 502 illustrating an example environment 500 which may include a vehicle 508 and an object 510. As shown, the vehicle 508 may include a trajectory 512 which may instruct the vehicle 508 to navigate through the intersection. Further, the object 510 may include an artificial path 514 that enters the intersection and splits into two different artificial paths, the first split artificial path 516 continuing through the intersection and the second split artificial path 518 performing a right turn maneuver upon entering the intersection. In this situation, the vehicle may determine the relevance of the object 510 based on determining whether the artificial path(s) of the object 510 and the trajectory 512 of the vehicle 508 cause the object 510 and the vehicle 508 to interact (or collide) at a future time. In such cases, the vehicle 508 may generate an occupancy grid and determine whether the object 510 and the vehicle 508 spatially and temporally overlap.

As shown, FIG. 5 may include a box 504 which may represent an occupancy grid with one or more cells. In this example, the occupancy grid may include eight columns and five rows; however, in other examples, the occupancy grid may include more or less columns and/or rows. In this example, the vehicle 508 may determine which cell(s) of the occupancy grid the object 510 and the vehicle 508 are predicted to occupy based on following the artificial paths and the trajectory 512. That is, the vehicle 508 may tag each cell which may be occupied by the object 510 based on following any of the artificial paths. Further, the vehicle 508 may tag each cell that may be occupied by the vehicle 508 based on the vehicle 508 following the trajectory 512. As shown, the occupancy grid may have light grey cells to indicate cells that are likely to be occupied by the object 510 or the vehicle 508. Further, the occupancy grid may have a dark grey cell 520 which may represent the cell that is likely to be occupied by both the object 510 and the vehicle 508. The dark grey cell 520 indicates a spatial overlap of the object 510 and the vehicle 508. Based on the spatial overlap, the vehicle 508 may determine whether there is a temporal overlap at the cell 520.

As shown, FIG. 5 may include a box 506 which may represent the occupancy grid and where the object 510 and the vehicle 508 may be positioned temporally with respect to the cell 520. As indicated above, when determining whether the object 510 temporally overlaps with the vehicle 508 at the cell 520, the vehicle 508 may determine whether object 510 can affect the decision making of the vehicle 508. If the object 510 can affect the decision making of the vehicle 508, the vehicle may determine that the object 510 is relevant to the vehicle 508. In some examples, the vehicle 508 may determine that the object 510 does not affect the decision making of the vehicle 508 if a minimum time of arrival (e.g., the fastest the object 510 can arrive at the cell 520) of the object 510 to the cell 520 is greater than a maximum time (e.g., the slowest the vehicle 508 can arrive at the cell 520 based on the trajectory) of arrival of the vehicle 508 at the cell 520 (e.g., $t_{object\_min} > t_{vehicle\_max} + \Delta t$). As shown in box 506, the location of the vehicle 508 may represent where the vehicle 508 may be positioned according to the maximum time of the vehicle 508 to arrive at the cell 520. Further, the location of the object 510 may represent where the object 510 may be positioned according to the minimum time of the object 510 to arrive at the cell 520. As such, since the vehicle 508 arrives at the cell 520 prior to the object 510, the vehicle may determine that the maximum time of arrival for the vehicle 508 to the cell 520 is less than the minimum time of arrival of the object 510 to the cell 520. As such, the vehicle 508 may determine that the object 510 is irrelevant and may exclude the object 510 from further processing.

Figure 6:
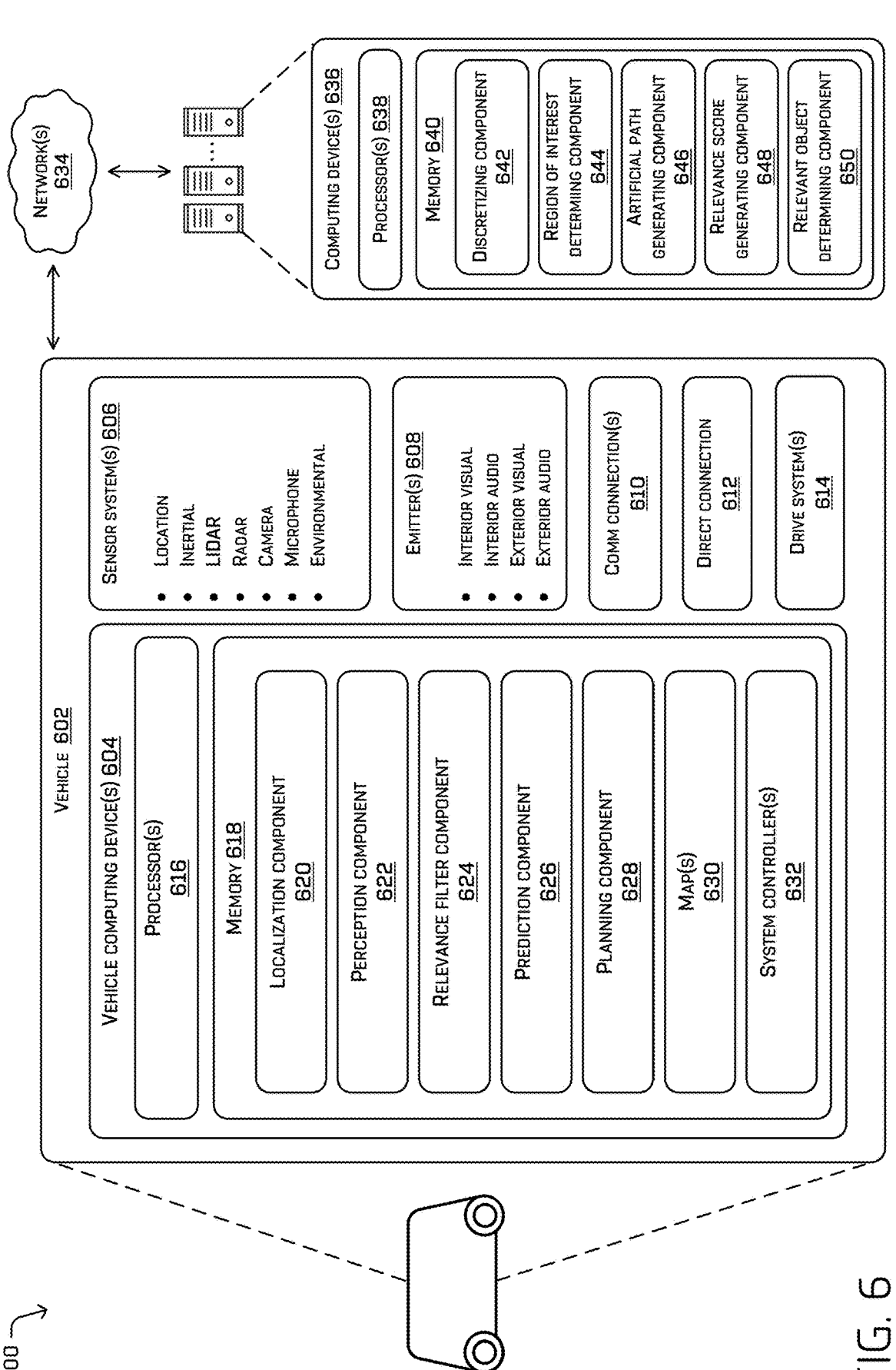
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622, a relevance filter component 624, a prediction component 626, a planner component 628, one or more system controllers 632, and one or more maps 630 (or map data). Though depicted in FIG. 6 as residing in the memory 618 for illustrative purposes, it is contemplated that the localization component 620, the perception component 622, the relevance filter component 624, the prediction component 626, the planner component 628, system controller(s) 632, and/or the map(s) may additionally, or alternatively, be accessible to the vehicle 602 (e.g., stored on, or otherwise accessible by, memory remote from the vehicle 602, such as, for example, on memory 640 of one or more computing device 636 (e.g., a remote computing device)). In some examples, the memory 640 may include a discretizing component 642, a region of interest determining component 644, an artificial path generating component 646, a relevance score generating component 648, and a relevance object determining component 650.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.).

In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 626 may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior.

In general, the planner component 628 may determine a path for the vehicle 602 to follow to traverse through an environment. For example, the planner component 628 may determine various routes and trajectories and various levels of detail. For example, the planner component 628 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 628 may generate an instruction for guiding the vehicle 602 along at least a portion of the route from the first location to the second location. In at least one example, the planner component 628 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 628 may select a trajectory for the vehicle 602.

In other examples, the planner component 628 may alternatively, or additionally, use data from the localization component 620, the perception component 622, and/or the prediction component 626 to determine a path for the vehicle 602 to follow to traverse through an environment. For example, the planner component 628 may receive data (e.g., object data) from the localization component 620, the perception component 622, and/or the prediction component 626 regarding objects associated with an environment. In some examples, the planner component 628 receives data for relevant objects within the environment. Using this data, the planner component 628 may determine a route to travel from a first location (e.g., a current location) to a second location (e.g., a target location) to avoid objects in an environment. In at least some examples, such a planner component 628 may determine there is no such collision-free path and, in turn, provide a path that brings vehicle 602 to a safe stop avoiding all collisions and/or otherwise mitigating damage.

The relevance filter component 624 may perform any of the techniques described with respect to any of FIGS. 1-5B above with respect to identifying relevant objects based on generating and/or evaluating artificial path(s).

In at least one example, the vehicle computing device 604 may include one or more system controllers 632, which may be configured to control steering, propulsion, braking, safety, emitters, communication, and other systems of the vehicle 602. The system controller(s) 632 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planner component 628 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 634. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

In some instances, aspects of some or all of the components discussed herein may include any models, techniques, and/or machine-learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatter-plot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 634, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 636, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 634. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the relevance filter component 624, the prediction component 626, the planner component 628, the one or more system controllers 632, and the one or more maps 630 may process sensor data, as described above, and may send their respective outputs, over the one or more network(s) 634, to the computing device(s) 636. In at least one example, the localization component 620, the perception component 622, the relevance filter component 624, the prediction component 626, the planner component 628, the one or more system controllers 632, and the one or more maps 630 may send their respective outputs to the computing device(s) 636 at a particular frequency, after a lapse of a predetermined period of time, in near real-time, etc.

In some examples, the vehicle 602 may send sensor data to the computing device(s) 636 via the network(s) 634. In some examples, the vehicle 602 may receive sensor data from the computing device(s) 636 and/or remote sensor system(s) via the network(s) 634. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640, which may include a discretizing component 642, a region of interest determining component 644, an artificial path generating component 646, a relevance score generating component 648, and a relevance object determining component 650. In some examples, the memory 640 may store one or more of components that are similar to the component(s) stored in the memory 618 of the vehicle 602. In such examples, the computing device(s) 636 may be configured to perform one or more of the processes described herein with respect to the vehicle 602. In some examples, the discretizing component 642, the region of interest determining component 644, the artificial path generating component 646, the relevance score generating component 648, and the relevance object determining component 650 may perform substantially similar functions as the relevance filter component 624.

The processor(s) 616 of the vehicle 602 and the processor(s) 638 of the computing device(s) 636 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 7 is a flow diagram illustrating an example process 700 for determining that an object is in a region of interest, generating an artificial path for the object based on the object being in the region of interest, determining the vehicle and the object overlap at a cell of an occupancy map, and controlling the vehicle based on determining a relevance score for the object based on a spatial and temporal overlap. As described below, the example process 700 may be performed by one or more computer computer-based components configured to implement various functionalities described herein. For instance, process 700 may be performed by a relevance filter component 202. As described above, the relevance filter component 202 may be integrated as an on-vehicle system. However, in other examples, the relevance filter component 202 may be integrated as a separate server-based system.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the relevance filter component may receive sensor data associated with a portion of an environment proximate a region of interest. The vehicle may store a list of one or more region(s) of the environment that may be considered a region of interest. A region of interest may be any region where an object may navigate that can subject the vehicle to a potential interaction. For example, regions of interest may include junctions (or intersections), crosswalks, and/or any other region. Further, the vehicle can include additional regions in the list based on historical data. That is, the vehicle may evaluate historical data to identify regions which may lack road designations (e.g., crosswalks, etc.), but which object(s) in environment may still use. For example, the vehicle may analyze historical data to identify one or more locations in an environment that pedestrians jaywalk (e.g., cross the road without the use of a crosswalk). As such, the vehicle may include the jaywalking location in the list as a region of interest. In such instances, the list of regions of interests may be added to (or otherwise incorporated in) map data as regions of interest. Accordingly, when capturing sensor data from one or more sensor devices of the vehicle, the vehicle may access the map data, identify the regions of interest that are within a threshold distance from the vehicle, and target such regions with the sensor devices. That is, the vehicle may receive sensor data representative of a portion of the environment within and/or proximate to the regions of interest.

At operation 704, the relevance filter component may detect an object based on the sensor data. That is, the vehicle may analyze the sensor data and detect one or more objects in the environment. In some cases, the vehicle may identify an x-y coordinate representing the position of the object with respect to a local reference frame and/or global reference frame. As indicated above, the object(s) may be located within and/or proximate to one of the listed regions of interest. The vehicle may determine whether the object(s) are within the region of interest by projecting the location of the object into discretized map data and determining whether the cell within which the object is located corresponds to a region of interest.

At operation 706, the relevance filter component may determine that the object is located with a cell of discretized map data based on a location of the object. In some examples, the vehicle may receive map data associated with the region of the environment between the starting and ending locations. The map data may include information (e.g., static information) about the environment. In some examples, the map data may include identifiers that indicate one or more regions of interest. Such regions may include crosswalks, intersections, and/or any other location.

In some examples, the vehicle may generate a discretized representation of the map data. The vehicle may break down (or otherwise divide) the map data into one or more cells (or polygons) representing regions of the environment (or regions of interest within the environment). In some examples, the vehicle may determine any number of cells having any dimension, shape, and/or size (e.g., 10×10 meters, 20×20 meters, 10×20 meters, etc.). The vehicle may generate or otherwise determine the cells with reference to a global or local reference frame. As such, the location of each cell may be associated with an x-y coordinate or a range of x-y coordinates. For example, a cell may be represented as including a region of the environment spanning multiple x-coordinates and multiple y-coordinates. In some examples, as the cells represent and/or cover a region of the environment, such cells may include information about the objects and/or features of the environment (e.g., regions of interest) which are located within region of the environment covered by the cell. In such instances, a cell may have a cell identifier which corresponds to features and/or elements of the environment (e.g., located within the cell). For example, a cell identifier may correspond to a region of interest found within the region of the environment covered by the cell.

Accordingly, the vehicle may determine which cell of the discretized map data the object is located within. That is, the vehicle may access the discretized map data and determine which of the multiple cells the object is located within. As described above, cells may cover a region of the environment, and as such may include a range of x-y coordinates. As such, the vehicle may project the location (e.g., the coordinates) of the object into the discretized map data and determine which cell (e.g., range of x-y coordinates) the x-y coordinate of the object falls within. At operation 708, the relevance filter component may determine that the object is associated with the region of interest based on the object being in the cell. That is, the vehicle may determine that the object is an object of interest based on the object being located within a region of interest, approaching the region, and/or located within a threshold distance from an edge or center of the region of interest. In some examples, based on the cell within which the object is located, the vehicle may identify region(s) of interest within the cell. Further, the vehicle may determine whether the object is located within a portion of the environment encompassed by the region of interest or whether the object is located within a threshold distance from the region of interest. If the object is within the region of interest or within a threshold distance from the region of interest, the vehicle may determine that the object is an object of interest. In contrast, if the object is outside of the region of interest and/or outside the threshold distance from the region of interest, the vehicle may determine that the object is not an object of interest.

At operation 710, the relevance filter component may generate an artificial path for the object based on the object being in the region of interest. A path may be a spatial representation (e.g., a list of x-y coordinates) of the predicted movements of the vehicle without temporal information (whereas a trajectory has spatial and temporal data). An artificial path may be a path that is not representative of a current velocity of the object or a predicted trajectory of the object. For example, despite an object having a limited trajectory due to the limited velocity of the object, the vehicle can generate an artificial path that extends larger distances and/or in different directions than the predicted trajectory. That is, an object may have a predicted trajectory that is indicative of the object traveling five meters within a predetermine time frame due to the limited velocity of the object. However, the vehicle can generate an artificial path that extends 50 meters in various directions. Further, the vehicle may generate a single path for the object of interest; however, in other examples, the vehicle may generate multiple paths for the object of interest and such path(s) may include branches (e.g., the single path may split into two or more separate paths).

In some examples, when generating the artificial path for an object of interest, the vehicle may classify the object (e.g., vehicle, cyclist, pedestrian, etc.). Based on the object classification (or classification type), the vehicle may build a path along navigational routes likely used by such an object type (or classification). That is, if the object is a vehicle parked on the side of a road, the autonomous vehicle may generate a path along the road (e.g., a navigational route commonly used by vehicles) in a direction of travel corresponding to the heading of the vehicle. If the object is a pedestrian, the vehicle may generate a path along the sidewalk, jaywalking, and/or crossing a crosswalk (e.g., navigational routes commonly used by pedestrians). In some examples, the length of the paths may be determined based on a maximum velocity of the road (e.g., the speed limit) or the maximum velocity of the object multiplied with a specified time horizon (e.g., three seconds, eight seconds, 10 seconds, etc.). For example, if the speed limit of a road is 35 miles per hour, the vehicle may determine a distance indicating how far the object (classified as a vehicle) may travel if the vehicle were to travel at 35 mph. In such cases, the length of the artificial path may correspond to the distance.

At operation 712, the relevance filter component may whether the object and the vehicle overlap in an occupancy area spatially and temporally. In some examples, the vehicle may generate an occupancy map (or occupancy grid). An occupancy map may be a map or grid that covers a region of the environment, may be discretized into a plurality of cells, and indicates whether the object or the vehicle are predicted to occupy a cell at any point. That is, the occupancy map may be a discretized grid that covers the region of the environment upon which the vehicle navigates. The occupancy map represents portions of the environment that cover the vehicle's trajectories (e.g., current trajectory and/or candidate trajectories). In some examples, the vehicle may generate an occupancy grid that based on a predefined length and width (e.g., 100 meters×20 meters, etc.). The occupancy map may include various object(s) within the environment.

In some examples, the vehicle may determine which cell(s) of the occupancy map the object is predicted to occupy and which cells of the occupancy map the vehicle is predicted to occupy. That is, the vehicle may determine a spatial overlap of the cells for the vehicle and for the object of interest. In such cases, the vehicle may determine a list of one or more cells of the occupancy map that the object of interest is predicted to occupy (e.g., spatially) based on the x-y coordinates of the artificial path. An artificial path may include one or more states which may represent the predicted pose (e.g., position (e.g., x-y coordinate) and/or heading) of the object along the artificial path. As such, the vehicle may identify, at each state of the artificial path, which cell(s) the object is predicted to occupy and the vehicle may tag such cell(s) as potentially occupied by the object. Further, the vehicle may determine which cells of the occupancy map that the vehicle is predicted to occupy (e.g., spatially) based on the x-y coordinates of the trajectory of the vehicle. That is, a trajectory may include one or more states that represent the predicted vehicle state (e.g., pose data, velocity data (e.g., minimum and maximum), etc.) of the vehicle. As such, the vehicle may identify, for each state of the trajectory, which cell(s) of the occupancy map the vehicle is predicted to occupy and the vehicle may tag such cell(s) as being potential occupied by the vehicle.

Based on determining which cells of the occupancy map the vehicle and the object are predicted to occupy, the vehicle may determine whether the vehicle and the object are predicted to occupy one or more of the same cells. That is, the vehicle may evaluate the cells of the occupancy map and determine whether there are any cells that have been identified (or tagged) as being occupied by the object and the vehicle. If a cell has been tagged as being occupied by the object and the vehicle, the vehicle may indicate that there is a potential spatial overlap with the object of interest.

Based on the vehicle and the object occupying a same cell of the occupancy map, the vehicle may determine whether the object and the vehicle occupy the cell within a similar range of times. That is, the vehicle may determine whether the object can affect the vehicle's decision making (e.g., determine whether there is a temporal overlap). An object may not affect the vehicle's decision making if a minimum time of arrival of the object to the cell is greater than a maximum time of arrival of the vehicle at the same cell plus a buffer of time (e.g., $t_{object\_min} > t_{vehicle\_max} + \Delta t$). That is, if the vehicle passed the location of the cell prior to the arrival of the object, the vehicle may determine that the object cannot affect the way in which the vehicle operates and that there may not be a temporal overlap. However, if the object arrives to the cell prior to the vehicle or at the same time as the vehicle, the vehicle may determine that the object can affect the way in which the vehicle operations and that there may be a temporal overlap. As such, the vehicle may determine time values (e.g., minimum arrival time and/or maximum arrival time) corresponding to when the object may be located within a specific cell of the occupancy map. In some examples, the vehicle may determine, for each state of the artificial path, a minimum and/or maximum arrival time based on the object's dynamics and/or capabilities (e.g., maximum and minimum accelerations, maximum and minimum velocities, current velocity, current steering angle, current heading angle, maximum and minimum steering angles/rates, etc.). In some examples, the vehicle may determine, for each state of the vehicle's trajectory, a minimum and/or maximum arrival time based on the object's dynamics and/or capabilities (e.g., maximum and minimum accelerations, maximum and minimum velocities, current velocity, current steering angle, current heading angle, maximum and minimum steering angles/rates, etc.). That is, each state of the trajectory may include time data which may indicate a predicted maximum and/or minimum time arrival at the location of the state. As such, if the relevance filter component determines that the object and the vehicle do not spatially and temporally overlap in an occupancy area (e.g., a cell) (712: No), the vehicle may not generate a relevance score. That is, at operation 714, the relevance filter component may not generate a relevance score for the object as the object may not be relevant to the vehicle.

In contrast, if the relevance filter component determines that the object and the vehicle do overlap in an occupancy area spatially and temporally (712: Yes), the vehicle may determine relevance scores for such objects. That is, at operation 716, the relevance filter component may generate a relevance score associated with the object. A relevance score may indicate the degree (or level) of relevance of the object with respect to the vehicle. The relevance score may increase when the overlap is predicted to occur sooner (e.g., the sum of $t_{object\_min}$ and $t_{vehicle\_min}$ is low). In contrast, the relevance score may decrease when the sum of $t_{object\_min}$ and $t_{vehicle\_min}$ increases (i.e., when the interaction occurs later). In such examples, the vehicle may determine scores (or sub-scores) that represent the relevance of the object at each state located with the overlapping cell. Based on identifying the one or more sub-scores for each state in the cell, the vehicle may determine the overall relevance score as the highest sub-score. That is, the maximum sub-score may be the overall relevance score for the object of interest.

At operation 718, the relevance filter component may control the vehicle based on the relevance score. In some examples, the vehicle may send a number of the object(s) with the highest relevance scores, all objects having more than a threshold score, or otherwise to a prediction and/or planning component. The vehicle may determine a threshold number of object(s) which may be sent to prediction and/or planning components. In such cases, the vehicle may identify the object(s) with the highest relevance scores that are above the threshold number. The identified object(s) may be sent to the prediction and/or planning components for further processing and may ultimately be used to control the vehicle. In some examples, the number of object(s) to send to the prediction and/or planning components may be based on an amount of processing power and/or memory available for a processing operation (e.g., to ensure that a number of object(s) can be considered within a particular period of time).

Example Clauses

A: A system comprising: one or more processors; and one or more non-transitory computer-readable media storing computer-executable instructions that, when executed, cause the system to perform operations comprising: receiving, from a sensor associated with a vehicle, sensor data; detecting, based at least in part on the sensor data, an object associated with an object location; determining, based at least in part on inputting the object into a relevance filter, that the object is irrelevant to safe operation of the vehicle; determining, based at least in part on the object location, that the object is at least partially within a cell of discretized map data; determining, based at least in part on the object being at least partially within the cell, that the object is associated with a region of interest; generating, based at least in part on the object being associated with the region of interest, an artificial path associated with the object, the artificial path being a spatial representation of a movement of the object; determining, based at least in part on the artificial path of the object and a trajectory of the vehicle, that the object and the vehicle are associated with an occupancy area; generating, based at least in part on the object and the vehicle being associated with the occupancy area, a relevance score associated with the object; and controlling the vehicle based at least in part on the relevance score regardless of the object being determined to be irrelevant.

B: The system of paragraph A, wherein generating the artificial path is based at least in part on: determining a classification type of the object; determining a pose of the object; identifying, based at least in part on historical data and the pose of the object, a navigational route associated with the classification type; and generating, based at least in part on the navigational route, the artificial path.

C: The system of paragraph A, wherein the artificial path is a first artificial path, and wherein the first artificial path splits into a second artificial path and a third artificial path.

D: The system of paragraph A, wherein the region of interest is one or more of a crosswalk or an intersection, and wherein determining the object is associated with the region of interest further comprises determining an amount of uncertainty associated with an intent of the object.

E: The system of paragraph A, wherein generating the relevance score comprises: determining, based at least in part on the artificial path and kinematics of the object, a first minimum time for the object to arrive at the occupancy area; determining, based at least in part on the trajectory, a second minimum time for the vehicle to arrive at the occupancy area; and determining, based at least in part on a combination of the first minimum time and the second minimum time, the relevance score.

F: One or more non-transitory computer-readable media storing instructions executable by one or more processors, wherein the instructions, when executed, cause a system to perform operations comprising: receiving sensor data associated with an environment; detecting, based at least in part on the sensor data, an object; receiving a trajectory for a vehicle to traverse through the environment; determining, based at least in part on the trajectory and map data, a region of interest along the trajectory; generating, based at least in part on the object being associated with a region of interest or having an intent associated with a high level of uncertainty, an artificial path associated with the object; determining, based at least in part on the artificial path of the object and a trajectory of a vehicle, that the object and the vehicle are associated with an occupancy area; and generating, based at least in part on the object and the vehicle being associated with the occupancy area, a relevance score associated with the object.

G: The one or more non-transitory computer-readable media of paragraph F, wherein generating the artificial path is based at least in part on: determining a classification type of the object; and identifying, based at least in part on historical data of the object and the classification type, a navigational route; and generating, based at least in part on the navigational route, the artificial path.

H: The one or more non-transitory computer-readable media of paragraph F, wherein the artificial path is a first artificial path, and wherein the first artificial path splits into a second artificial path and a third artificial path.

I: The one or more non-transitory computer-readable media of paragraph F, wherein the operations further comprise: determining that the object is associated with the region of interest based at least in part on one or more of: a distance of the object to the region of interest being less than or equal to a threshold distance, or a determination that the object is approaching the region of interest.

J: The one or more non-transitory computer-readable media of paragraph F, wherein generating the relevance score comprises: determining, based at least in part on the artificial path and kinematics of the object, a first minimum time for the object to arrive at the occupancy area; determining, based at least in part on the trajectory, a second minimum time for the vehicle to arrive at the occupancy area; and determining, based at least in part on a combination of the first minimum time and the second minimum time, the relevance score.

K: The one or more non-transitory computer-readable media of paragraph F, wherein determining that the object and the vehicle are associated with the occupancy area comprises: determining that the artificial path of the object physically overlaps with the occupancy area; determining that the trajectory of the vehicle physically overlaps with the occupancy area; determining, based at least in part on the object and the vehicle physically overlapping at the occupancy area, that the object and the vehicle are associated with the occupancy area within a range of time values; and determining, based at least in part on the range of time values, that the object and the vehicle physically and temporally overlap at the occupancy area.

L: The one or more non-transitory computer-readable media of paragraph F, the operations further comprising: identifying a second object that is located outside of the region of interest; generating, based at least in part on a classification type of the second object and an intent of the object, a second artificial path for the second object; determining, based at least in part on the second artificial path and the trajectory, a second relevance score; and controlling the vehicle based at least in part on the second relevance score.

M: The one or more non-transitory computer-readable media of paragraph F, the operations further comprising: controlling the vehicle based at least in part on the relevance score.

N: A method comprising: receiving sensor data associated with an environment; detecting, based at least in part on the sensor data, an object; receiving a trajectory for a vehicle to traverse through the environment; determining, based at least in part on the trajectory and map data, a region of interest along the trajectory; generating, based at least in part on the object being associated with a region of interest or having an intent associated with a high level of uncertainty, an artificial path associated with the object; determining, based at least in part on the artificial path of the object and a trajectory of a vehicle, that the object and the vehicle are associated with an occupancy area; and generating, based at least in part on the object and the vehicle being associated with the occupancy area, a relevance score associated with the object.

O: The method of paragraph N, wherein generating the artificial path is based at least in part on: determining a classification type of the object; and identifying, based at least in part on historical data of the object and the classification type, a navigational route; and generating, based at least in part on the navigational route, the artificial path.

P: The method of paragraph N, wherein the artificial path is a first artificial path, and wherein the first artificial path splits into a second artificial path and a third artificial path.

Q: The method of paragraph N, further comprising: determining that the object is associated with the region of interest based at least in part on one or more of: a distance of the object to the region of interest being less than or equal to a threshold distance, or a determination that the object is approaching the region of interest.

R: The method of paragraph N, wherein generating the relevance score comprises: determining, based at least in part on the artificial path and kinematics of the object, a first minimum time for the object to arrive at the occupancy area; determining, based at least in part on the trajectory, a second minimum time for the vehicle to arrive at the occupancy area; and determining, based at least in part on a combination of the first minimum time and the second minimum time, the relevance score.

S: The method of paragraph N, wherein determining that the object and the vehicle are associated with the occupancy area comprises: determining that the artificial path of the object physically overlaps with the occupancy area; determining that the trajectory of the vehicle physically overlaps with the occupancy area; determining, based at least in part on the object and the vehicle physically overlapping at the occupancy area, that the object and the vehicle are associated with the occupancy area within a range of time values; and determining, based at least in part on the range of time values, that the object and the vehicle physically and temporally overlap at the occupancy area.

T: The method of paragraph N, further comprising: identifying a second object that is located outside of the region of interest; generating, based at least in part on a classification type of the second object and an intent of the object, a second artificial path for the second object; determining, based at least in part on the second artificial path and the trajectory, a second relevance score; and controlling the vehicle based at least in part on the second relevance score.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

receiving, from a sensor associated with a vehicle, sensor data;

detecting, based at least in part on the sensor data, an object associated with an object location;

determining, based at least in part on inputting the object into a relevance filter, that the object is irrelevant to safe operation of the vehicle;

determining, based at least in part on the object location, that the object is at least partially within a cell of discretized map data;

determining, based at least in part on the object being at least partially within the cell, that the object is associated with a region of interest, wherein determining the object is associated with the region of interest is further based at least in part on an amount of uncertainty associated with an intent of the object meeting or exceeding a threshold;

generating, based at least in part on the object being associated with the region of interest, an artificial path associated with the object, the artificial path being a spatial representation of a movement of the object;

determining, based at least in part on the artificial path of the object and a trajectory of the vehicle, that the object and the vehicle are associated with an occupancy area;

generating, based at least in part on the object and the vehicle being associated with the occupancy area, a relevance score associated with the object; and controlling the vehicle based at least in part on the relevance score regardless of the object being determined to be irrelevant.

2. The system of claim 1, wherein generating the artificial path is based at least in part on:

determining a classification type of the object;

determining a pose of the object;

identifying, based at least in part on historical data and the pose of the object, a navigational route associated with the classification type; and generating, based at least in part on the navigational route, the artificial path.

3. The system of claim 1, wherein the artificial path is a first artificial path, and wherein the first artificial path splits into a second artificial path and a third artificial path.

4. The system of claim 1, wherein the region of interest is one or more of a crosswalk or an intersection.

5. The system of claim 1, wherein generating the relevance score comprises:

determining, based at least in part on the artificial path and kinematics of the object, a first minimum time for the object to arrive at the occupancy area;

determining, based at least in part on the trajectory, a second minimum time for the vehicle to arrive at the occupancy area; and determining, based at least in part on a combination of the first minimum time and the second minimum time, the relevance score.

6. One or more non transitory computer readable media storing instructions executable by one or more processors, wherein the instructions, when executed, cause a system to perform operations comprising:

receiving sensor data associated with an environment;

detecting, based at least in part on the sensor data, an object;

receiving a trajectory for a vehicle to traverse through the environment;

determining, based at least in part on the trajectory and map data, a region of interest along the trajectory;

generating, based at least in part on the object being associated with a region of interest and having an intent associated with a level of uncertainty that meets or exceeds a threshold, an artificial path associated with the object;

determining, based at least in part on the artificial path of the object and the trajectory of the vehicle, that the object and the vehicle are associated with an occupancy area;

generating, based at least in part on the object and the vehicle being associated with the occupancy area, a relevance score associated with the object; and controlling the vehicle based at least in part on the relevance score.

7. The one or more non transitory computer readable media of claim 6, wherein generating the artificial path is based at least in part on:

determining a classification type of the object;

identifying, based at least in part on historical data of the object and the classification type, a navigational route; and generating, based at least in part on the navigational route, the artificial path.

8. The one or more non transitory computer readable media of claim 6, wherein the artificial path is a first artificial path, and wherein the first artificial path splits into a second artificial path and a third artificial path.

9. The one or more non transitory computer readable media of claim 6, wherein the operations further comprise:

determining that the object is associated with the region of interest based at least in part on one or more of:

a distance of the object to the region of interest being less than or equal to a threshold distance, or a determination that the object is approaching the region of interest.

10. The one or more non transitory computer readable media of claim 6, wherein generating the relevance score comprises:

determining, based at least in part on the artificial path and kinematics of the object, a first minimum time for the object to arrive at the occupancy area;

determining, based at least in part on the trajectory, a second minimum time for the vehicle to arrive at the occupancy area; and determining, based at least in part on a combination of the first minimum time and the second minimum time, the relevance score.

11. The one or more non transitory computer readable media of claim 6, wherein determining that the object and the vehicle are associated with the occupancy area comprises:

determining that the artificial path of the object physically overlaps with the occupancy area;

determining that the trajectory of the vehicle physically overlaps with the occupancy area;

determining, based at least in part on the object and the vehicle physically overlapping at the occupancy area, that the object and the vehicle are associated with the occupancy area within a range of time values; and determining, based at least in part on the range of time values, that the object and the vehicle physically and temporally overlap at the occupancy area.

12. The one or more non transitory computer readable media of claim 6, the operations further comprising:

identifying a second object that is located outside of the region of interest;

generating, based at least in part on a classification type of the second object and the intent of the object, a second artificial path for the second object;

determining, based at least in part on the second artificial path and the trajectory, a second relevance score; and controlling the vehicle based at least in part on the second relevance score.

13. The one or more non transitory computer readable media of claim 6, the operations further comprising:
controlling the vehicle based at least in part on the relevance score.

14. A method comprising:
receiving sensor data associated with an environment;
detecting, based at least in part on the sensor data, an object;
receiving a trajectory for a vehicle to traverse through the environment;
determining, based at least in part on the trajectory and map data, a region of interest along the trajectory;
generating, based at least in part on the object being associated with the region of interest and having an intent associated with a level of uncertainty that meets or exceeds a threshold, an artificial path associated with the object;
determining, based at least in part on the artificial path of the object and the trajectory of the vehicle, that the object and the vehicle are associated with an occupancy area;
generating, based at least in part on the object and the vehicle being associated with the occupancy area, a relevance score associated with the object; and
controlling the vehicle based at least in part on the relevance score.

15. The method of claim 14, wherein generating the artificial path is based at least in part on:
determining a classification type of the object;
identifying, based at least in part on historical data of the object and the classification type, a navigational route; and
generating, based at least in part on the navigational route, the artificial path.

16. The method of claim 14, wherein the artificial path is a first artificial path, and wherein the first artificial path splits into a second artificial path and a third artificial path.

17. The method of claim 14, further comprising:
determining that the object is associated with the region of interest based at least in part on one or more of:

a distance of the object to the region of interest being less than or equal to a threshold distance, or
a determination that the object is approaching the region of interest.

18. The method of claim 14, wherein generating the relevance score comprises:
determining, based at least in part on the artificial path and kinematics of the object, a first minimum time for the object to arrive at the occupancy area;
determining, based at least in part on the trajectory, a second minimum time for the vehicle to arrive at the occupancy area; and
determining, based at least in part on a combination of the first minimum time and the second minimum time, the relevance score.

19. The method of claim 14, wherein determining that the object and the vehicle are associated with the occupancy area comprises:
determining that the artificial path of the object physically overlaps with the occupancy area;
determining that the trajectory of the vehicle physically overlaps with the occupancy area;
determining, based at least in part on the object and the vehicle physically overlapping at the occupancy area, that the object and the vehicle are associated with the occupancy area within a range of time values; and
determining, based at least in part on the range of time values, that the object and the vehicle physically and temporally overlap at the occupancy area.

20. The method of claim 14, further comprising:
identifying a second object that is located outside of the region of interest;
generating, based at least in part on a classification type of the second object and the intent of the object, a second artificial path for the second object;
determining, based at least in part on the second artificial path and the trajectory, a second relevance score; and
controlling the vehicle based at least in part on the second relevance score.

*   *   *   *   *